(12) United States Patent
Tsai et al.

(10) Patent No.: US 8,422,146 B1
(45) Date of Patent: Apr. 16, 2013

(54) IMAGING LENS ASSEMBLY

(75) Inventors: Tsung-Han Tsai, Taichung (TW);
Hsin-Hsuan Huang, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 0 days.

(21) Appl. No.: 13/445,219

(22) Filed: Apr. 12, 2012

(30) Foreign Application Priority Data

Dec. 2, 2011 (TW) .............................. 100144429 A

(51) Int. Cl.
*G02B 3/02* (2006.01)
*G02B 9/34* (2006.01)

(52) U.S. Cl.
USPC ......................................... 359/715; 359/773

(58) Field of Classification Search .................. 359/715, 359/771, 772, 773
See application file for complete search history.

(56) References Cited

U.S. PATENT DOCUMENTS 7,920,340 B2 4/2011 Tang
7,957,079 B2 6/2011 Tang

*Primary Examiner* — Jack Dinh
(74) *Attorney, Agent, or Firm* — Morris Manning & Martin LLP; Tim Tingkang Xia, Esq.

(57) ABSTRACT

An imaging lens assembly includes, in order from an object side to an image side, a first lens element with positive refractive power having a convex object-side surface, a second lens element with negative refractive power having a concave object-side surface and a concave image-side surface, a third lens element with positive refractive power having a concave object-side surface and a convex image-side surface, and a fourth lens element with negative refractive power having a concave object-side surface and a concave image-side surface. The third lens element and the fourth lens element are aspheric. The fourth lens element has at least one inflection point. By adjusting the distance between the second lens element and the first lens element as well as the thickness of the second lens element, the imaging lens assembly can be easy to be manufactured and assembled without decreasing its imaging quality.

20 Claims, 20 Drawing Sheets

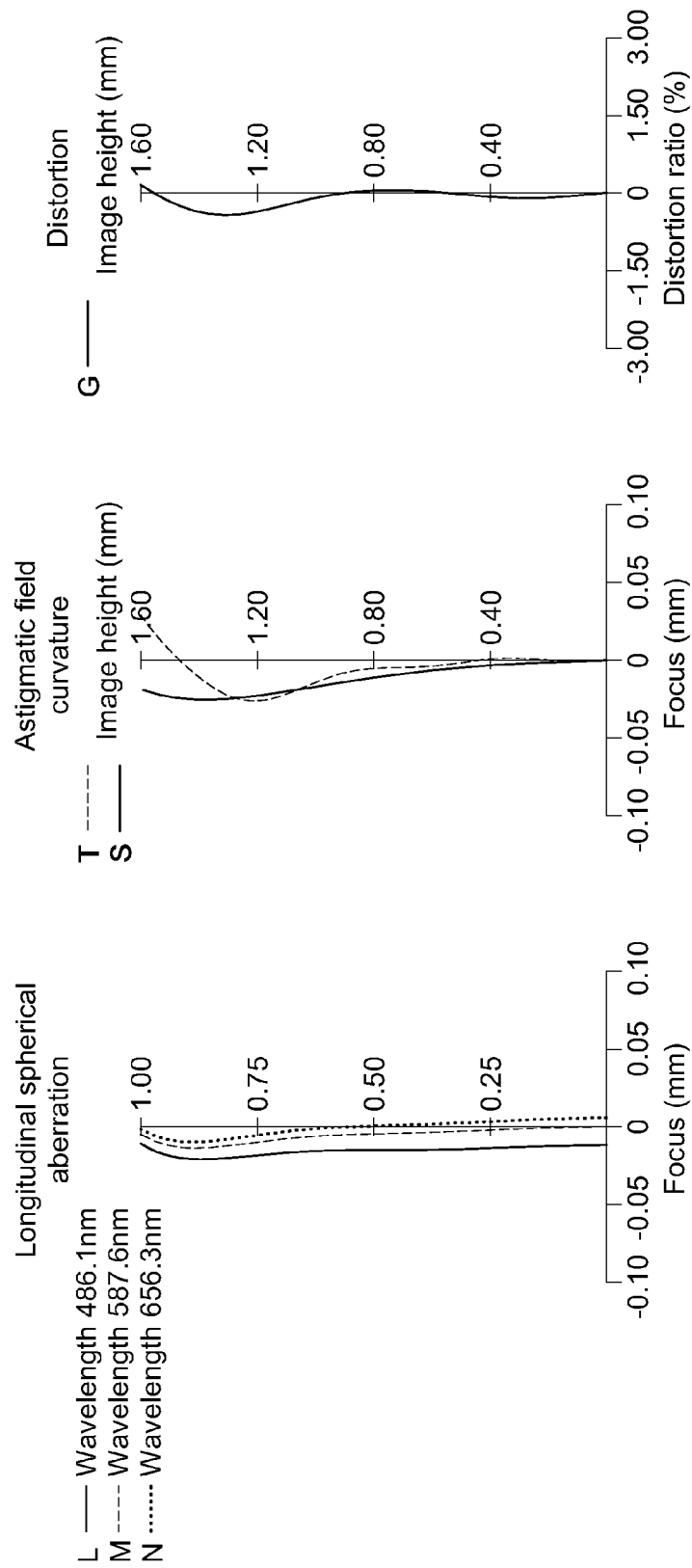

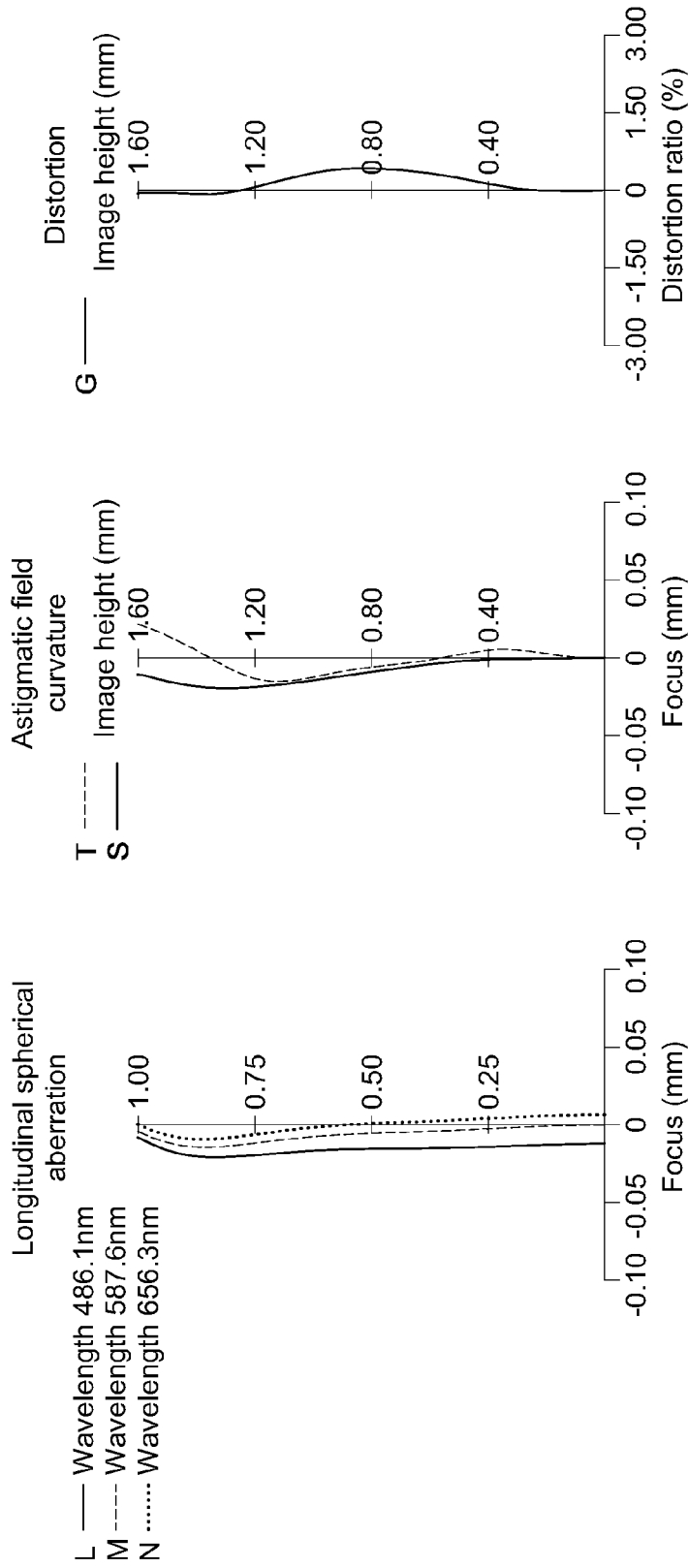

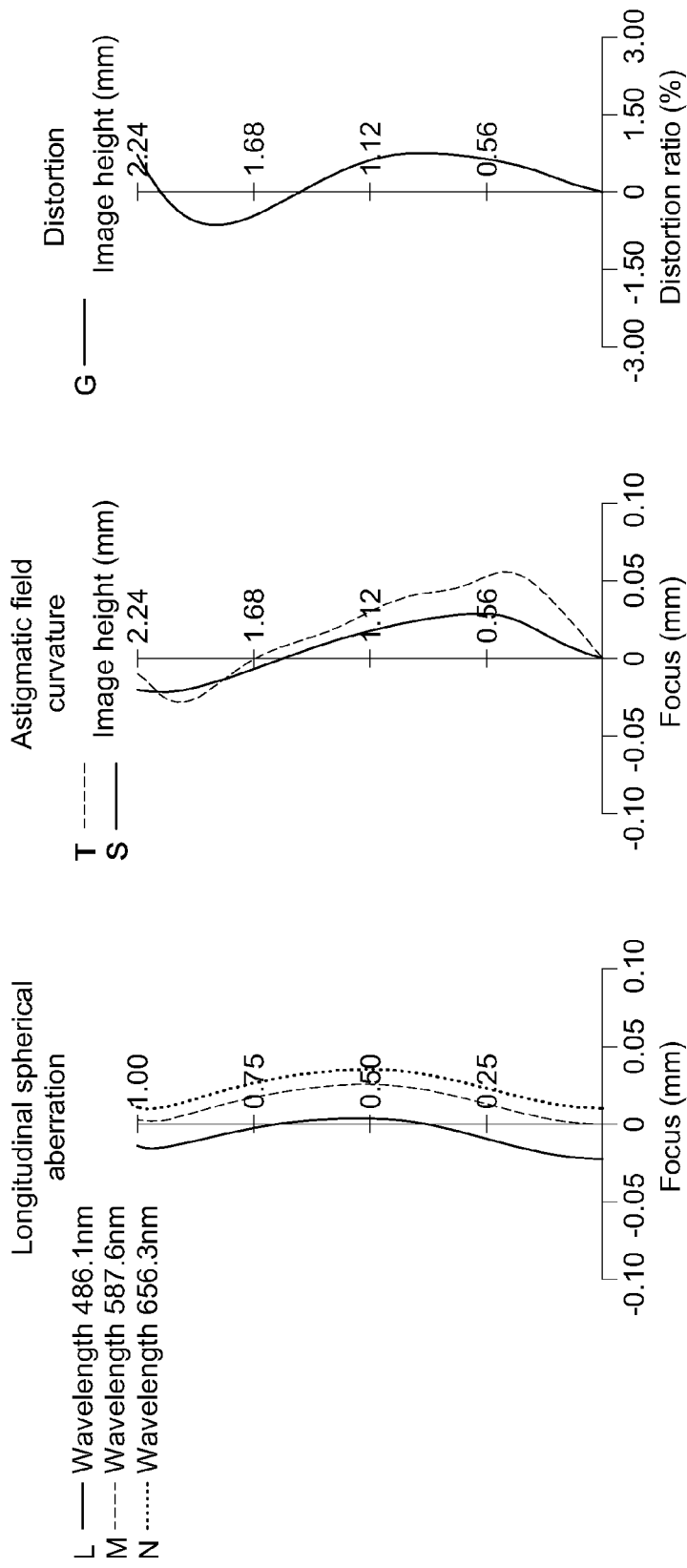

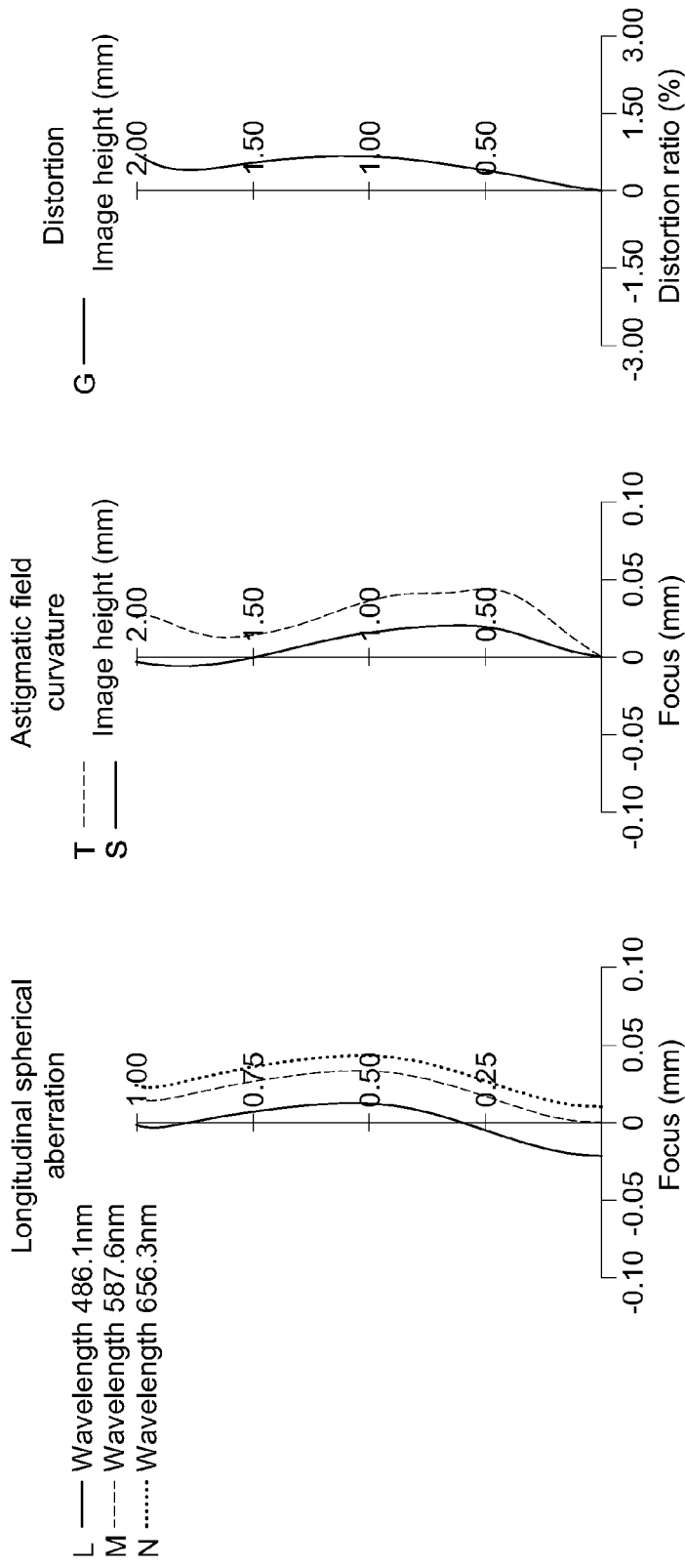

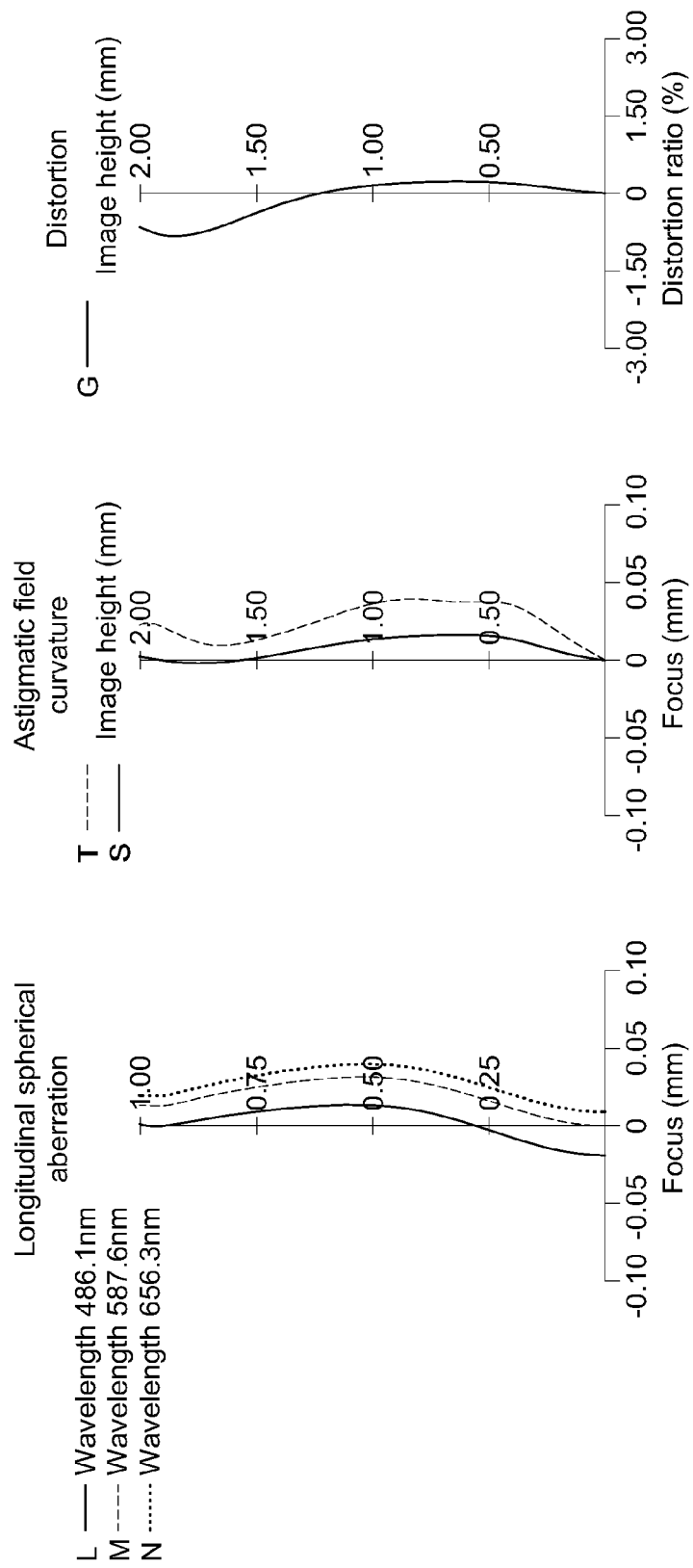

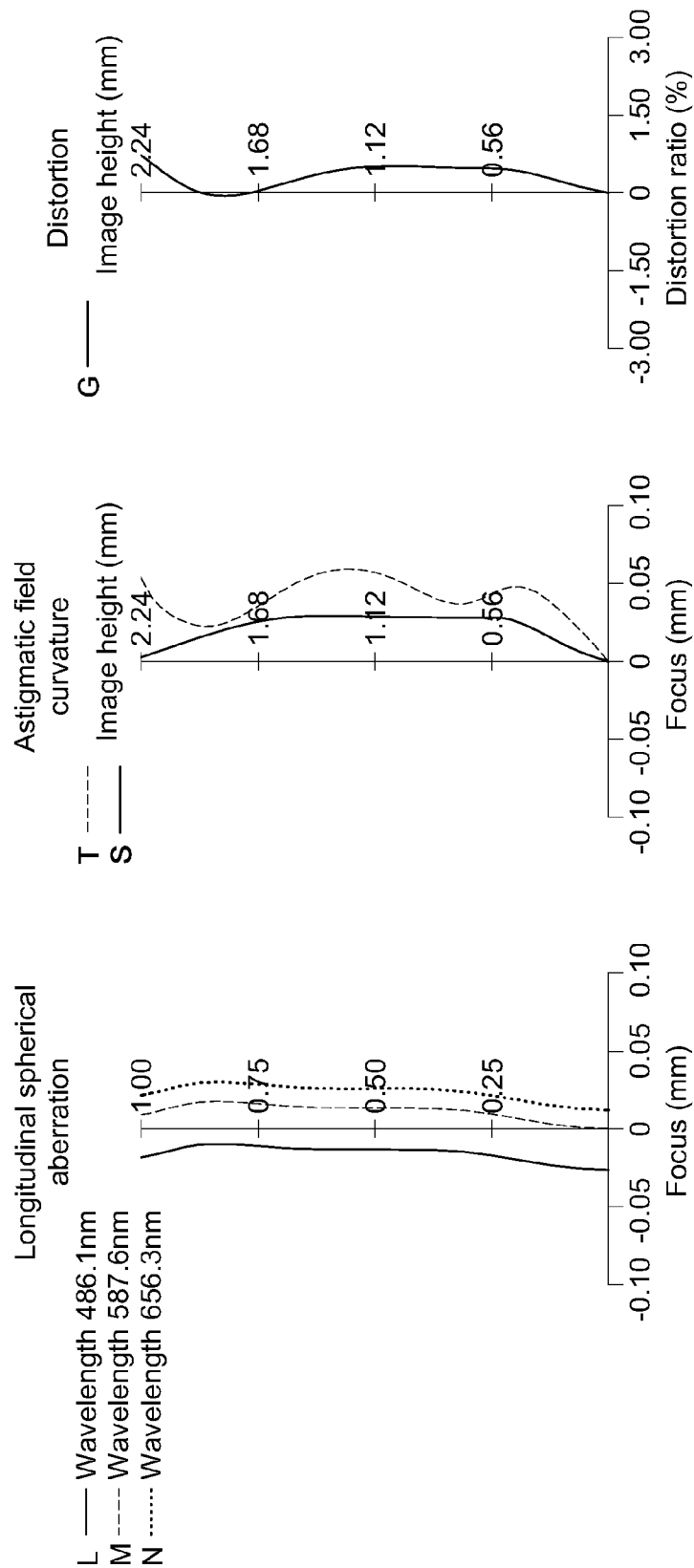

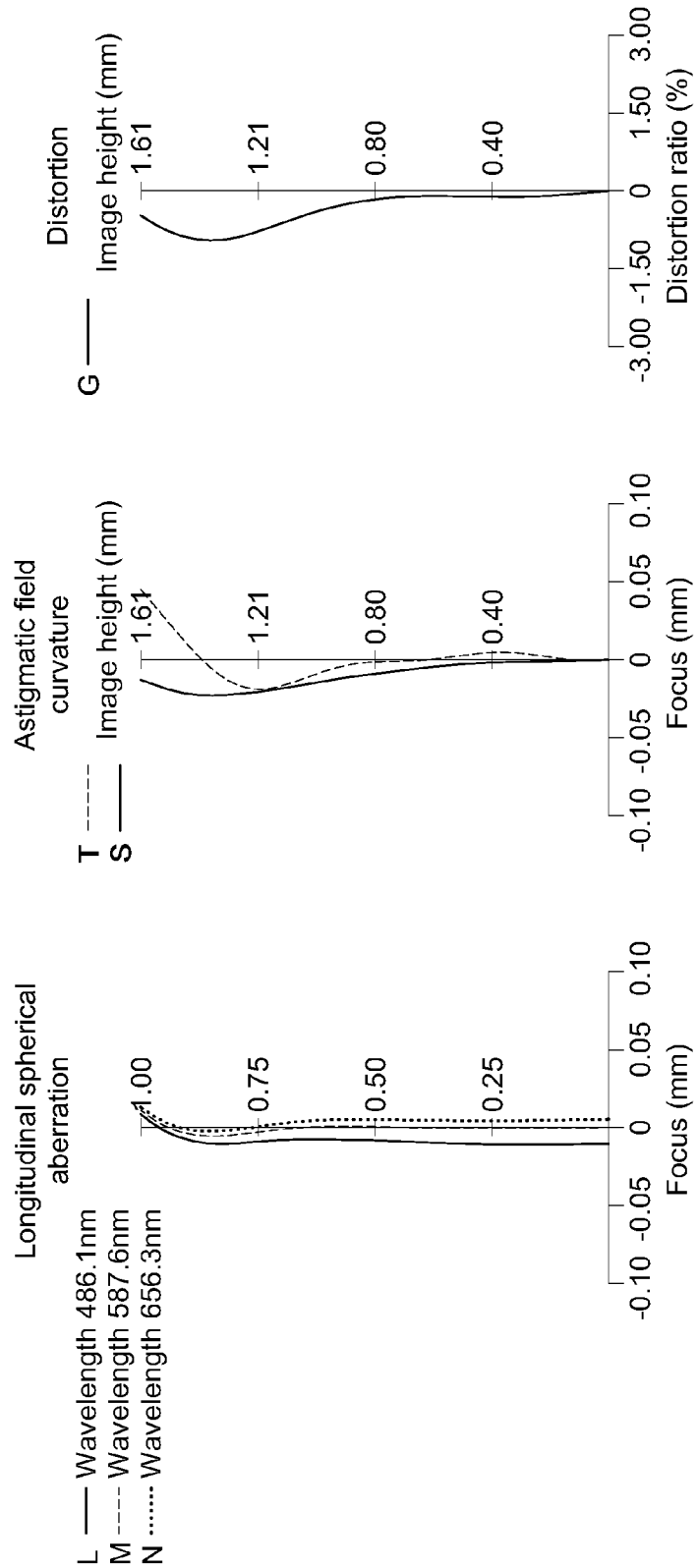

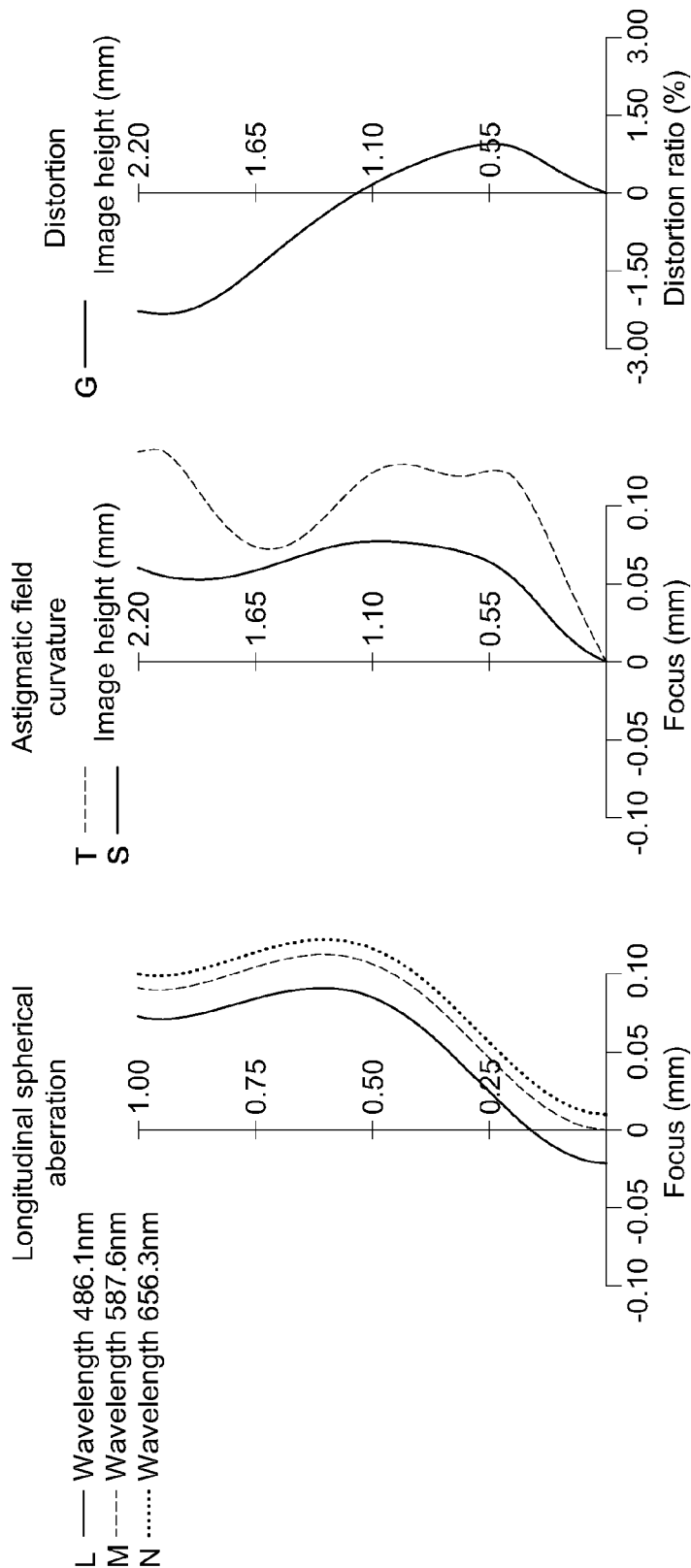

IMAGING LENS ASSEMBLY

CROSS-REFERENCE TO RELATED APPLICATIONS

This non-provisional application claims priority under 35 U.S.C. §119(a) on Patent Application No(s). 100144429 filed in Taiwan, R.O.C. on Dec. 2, 2011, the entire contents of which are hereby incorporated by reference.

BACKGROUND

1. Technical Field

The present disclosure relates to an imaging lens assembly, and more particularly to an imaging lens assembly applicable to a portable electronic device.

2. Related Art

In recent years, with the prosperity of photographing optical lens assemblies, the demands for compact photographing cameras rise exponentially. The photo-sensing device, e.g. a sensor, of an ordinary photographing camera is commonly selected from a charge coupled device (CCD) and a complementary metal-oxide semiconductor (CMOS) device. In addition, as the semiconductor manufacturing technology enables the sensors with miniaturized pixels, the development of the photographic lens assemblies is heading toward producing high resolution image and getting compact. Therefore, researches on miniaturized photographic lens assembly which is capable of forming high quality images on a miniaturized image sensor have been vigorously conducted.

A related art high-resolution photographic lens assembly consists of a front stop and a four lens group. For example, U.S. Pat. Nos. 7,920,340 and 7,957,079 disclose a four-lens independent photographic lens assembly. In these assemblies, an axial distance between a first lens element and a second lens element is shorter, resulting in a more complex assembly process, with low yield rate and high manufacturing cost of lens assembly. Otherwise, a central thickness of the second lens element is thicker, resulting in longer optical total length. With the development of the photographic lens assemblies is heading toward getting compact, the problem of longer optical total length of the photographic lens assembly needs to be solved.

SUMMARY

According to an embodiment of the present disclosure, an imaging lens assembly comprises, in order from an object side to an image side: a first lens element with positive refractive power, a second lens element with negative refractive power, a third lens element with positive refractive power, and a fourth lens element with negative refractive power. The first lens element comprises a convex object-side surface. The second lens element comprises a concave object-side surface and a concave image-side surface. The third lens element comprises a concave aspheric object-side surface and a convex aspheric image-side surface. The fourth lens element comprises a concave aspheric object-side surface and a concave aspheric image-side surface with at least one of the object-side surface and the image-side surface comprising at least one inflection point.

Wherein $T_{12}$ is an axial distance between the first lens element and the second lens element; $CT_2$ is a central thickness of the second lens element; $V_1$ is the Abbe number of the first lens element; $V_2$ is the Abbe number of the second lens element; $f_1$ is the focal length of the first lens element; and $f_3$ is the focal length of the third lens element. The imaging lens assembly satisfies following conditions:

$$1.0 < T_{12}/CT_2 < 3.0; \qquad \text{(Condition 1)}$$

$$25 < V_1 - V_2 < 60; \text{ and} \qquad \text{(Condition 2)}$$

$$0 < f_3/f_1 < 0.75. \qquad \text{(Condition 3)}$$

According to another embodiment of the present disclosure, a imaging lens assembly comprises, in order from an object side to an image side: a first lens element with positive refractive power, a second lens element with negative refractive power, a third lens element with positive refractive power, and a fourth lens element with negative refractive power. The first lens element comprises a convex object-side surface. The second lens element comprises a concave object-side surface and a concave image-side surface. The third lens element comprises a concave aspheric object-side surface and a convex aspheric image-side surface. The fourth lens element comprises a concave aspheric object-side surface, a concave aspheric image-side surface with at least one of the object-side surface and the image-side surface comprising at least one inflection point.

Wherein the imaging lens assembly further comprises a stop, the stop is disposed between the first lens element and the second lens element; $T_{12}$ is an axial distance between the first lens element and the second lens element; $CT_2$ is a central thickness of the second lens element; $V_1$ is the Abbe number of the first lens element; $V_2$ is the Abbe number of the second lens element; TD is an axial distance between the object-side surface of the first lens element and the image-side surface of the fourth lens element; and SD is an axial distance between the stop and the image-side surface of the fourth lens element. The imaging lens assembly satisfies Condition 1, Condition 2, and the following condition:

$$0.70 < SD/TD < 0.92. \qquad \text{(Condition 4)}$$

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 1B, FIG. 1C, FIG. 1D are schematic views of longitudinal spherical aberration curves, astigmatic field curves, and a distortion curve, respectively in the imaging lens assembly in FIG. 1A;

FIG. 2B, FIG. 2C, FIG. 2D are schematic views of longitudinal spherical aberration curves, astigmatic field curves, and a distortion curve, respectively in the imaging lens assembly in FIG. 2A;

FIG. 3B, FIG. 3C, FIG. 3D are schematic views of longitudinal spherical aberration curves, astigmatic field curves, and a distortion curve, respectively in the imaging lens assembly in FIG. 3A;

FIG. 4B, FIG. 4C, FIG. 4D are schematic views of longitudinal spherical aberration curves, astigmatic field curves, and a distortion curve, respectively in the imaging lens assembly in FIG. 4A;

FIG. 6B, FIG. 6C, FIG. 6D are schematic views of longitudinal spherical aberration curves, astigmatic field curves, and a distortion curve, respectively in the imaging lens assembly in FIG. 6A;

FIG. 7B, FIG. 7C, FIG. 7D are schematic views of longitudinal spherical aberration curves, astigmatic field curves, and a distortion curve, respectively in the imaging lens assembly in FIG. 7A;

FIG. 8B, FIG. 8C, FIG. 8D are schematic views of longitudinal spherical aberration curves, astigmatic field curves, and a distortion curve, respectively in the imaging lens assembly in FIG. 8A;

FIG. 10B, FIG. 10C, FIG. 10D are schematic views of longitudinal spherical aberration curves, astigmatic field curves, and a distortion curve, respectively in the imaging lens assembly in FIG. 10A.

DETAILED DESCRIPTION

Figure 1A:
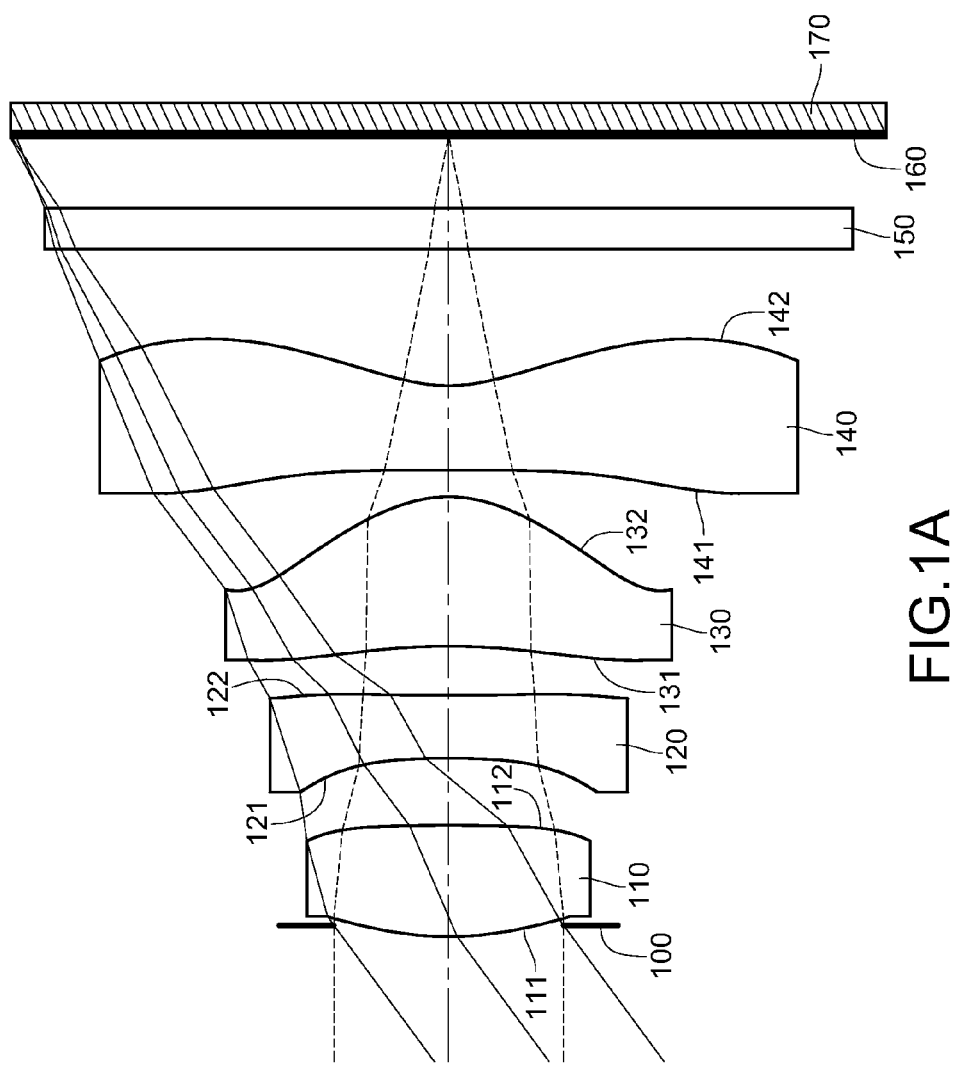
FIG. 1A is a schematic structural view of a first embodiment of a imaging lens assembly according to the present disclosure.

One of the embodiments of the imaging lens assemblies of the present disclosure is described with FIG. 1A as an example to illustrate the lens combinations, the configuration relationships and the conditions of the imaging lens assemblies that are commonly disclosed by the embodiments of the disclosure. The differences between the embodiments will be described in detail in embodiments other than the embodiment described in FIG. 1A.

Taking FIG. 1A as an example, the imaging lens assembly 1 comprises, from an object side to an image side along an optical axis, i.e. from left to right in FIG. 1A, in sequence, a stop, a first lens element 110, a second lens element 120, a third lens element 130, a fourth lens element 140, an infrared cut filter 150 and an image sensor 170 disposed on an image plane 160. In this embodiment, the stop is, for example, an aperture stop 100.

The first lens element 110 comprises an object-side surface 111 and an image-side surface 112. The refractive power of the first lens element 110 is positive for providing a portion of the overall refractive power needed by the imaging lens assembly 1, and therefore, reducing the total optical length of the imaging lens assembly 1. Moreover, the object-side surface 111 is convex, the positive refractive power of the first lens element 110 is further enhanced which enables the total optical length of the imaging lens assembly 1 being even shorter.

The second lens element 120 comprises an object-side surface 121 and an image-side surface 122. The refractive power of the second lens element 120 is negative for correcting the aberration generated by the first lens element 110 with positive refractive power. Moreover, the object-side surface 121 and the image-side surface 122 are concave for correcting the Petzval Sum of the optical lens assembly 1 to obtain better image quality.

The third lens element 130 comprises an object-side surface 131 and an image-side surface 132. The refractive power of the third lens element 130 is positive for effectively distributing the refractive power of the imaging lens assembly 1, so the sensitivity of the imaging lens assembly 1 is lowered. The object-side surface 131 is concave and the image-side surface 132 is convex for correcting the astigmatism of the imaging lens assembly 1. Furthermore, the object-side surface 131 and the image-side surface 132 are aspheric.

The fourth lens element 140 comprises an object-side surface 141 and an image-side surface 142. The refractive power of the fourth lens element 140 is negative for keeping the principal point of the imaging lens assembly 1 away from the image plane 160 to shorten a back focal length. Moreover, the object-side surface 141 and the image-side surface 142 are concave for enhancing the negative refractive power of the fourth lens element 140 to further reduce the total optical length of the imaging lens assembly 1. The object-side surface 141 and the image-side surface 142 are aspheric. At least one surface of the fourth lens element 140 has at least one inflection point for reducing the angle of incidence on the image sensor 170, and, therefore, correcting the off-axis aberrations.

Moreover, the imaging lens assembly 1 further comprises an aperture stop 100 which is, disposed between the first lens element 110 and the second lens element 120 (for example, the third embodiment, the fourth embodiment, the fifth embodiment, the sixth embodiment, the seventh embodiment, the ninth embodiment and the tenth embodiment) is favorable for the characteristic of the wide angle of view as well as correcting the distortion and chromatic aberration. In addition, the sensitivity of the imaging lens assembly 1 is effectively lowered.

The imaging lens assembly 1 of the present disclosure satisfies the following conditions:

$1.0 < T_{12}/CT_2 < 3.0$ (Condition 1):

$25 < V_1 - V_2 < 60$ (Condition 2):

$0 < f_3/f_1 < 0.75$ (Condition 3):

$T_{12}$ is an axial distance between the first lens element 110 and the second lens element 120, $CT_2$ is a central thickness of the second lens element 120, $V_1$ is the Abbe number of the first lens element 110, $V_2$ is the Abbe number of the second lens element 120, $f_1$ is the focal length of the first lens element 110, and $f_3$ is the focal length of the third lens element 130.

When Condition 1 is satisfied, the spacing of the imaging lens assembly 1 is well allocated and the problem of complex assembly due to close spacing between the first lens element 110 and the second lens element 120 can be solved, as well as the issue of low manufacturing yield rate due to the thickness of the second lens element 120 being too thin can be avoided, thereby, lowering manufacturing costs. In some embodiments, the first lens element 110 and the second lens element 120 satisfy: $1.2<T_{12}/CT_2<3.0$. When Condition 2 is satisfied, the chromatic aberration of the imaging lens assembly 1 is corrected. When Condition 3 is satisfied, the distribution of the refractive power between the first lens element 110 and the third lens element 130 is appropriate to prevent the first lens element 110 or the third lens element 130 from excessively high refractive power, thereby, lowering the sensitivity of the imaging lens assembly 1.

Moreover, the imaging lens assembly 1 of the present disclosure may further satisfy at least one of the following conditions:

$0.70<SD/TD<0.92$ (Condition 4):

$-1<(R_3+R_4)/(R_3-R_4)<0$ (Condition 5):

$0<(R_7+R_8)/(R_7-R_8)<1$ (Condition 6):

$3.5<|f/f_3+|f/f_4|<6.5$ (Condition 7):

$0<f_4/f_2<0.35$ (Condition 8):

$1<T_{12}/T_{23}<2.4$ (Condition 9):

TD is an axial distance between the object-side surface 111 of the first lens element 110 and the image-side surface 142 of the fourth lens element 140; SD is an axial distance between the aperture stop 100 and the image-side surface 142 of the fourth lens element 140; $R_3$ is the curvature radius of the object-side surface 121 of the second lens element 120; $R_4$ is the curvature radius of the image-side surface 122 of the second lens element 120; $R_7$ is the curvature radius of the object-side surface 141 of the fourth lens element 140; $R_8$ is the curvature radius of the image-side surface 142 of the fourth lens element 140; f is the focal length of the imaging lens assembly 1; $f_3$ is the focal length of the third lens element 130; $f_4$ is the focal length of the fourth lens element 140; $f_2$ is the focal length of the second lens element 120; $T_{12}$ is an axial distance between the first lens element 110 and the second lens element 120; and $T_{23}$ is an axial distance between the second lens element 120 and the third lens element 130.

When Condition 4 is satisfied, a balance between the characteristics of telecentricity and wide angle is achieved, so that in a sufficient viewing angle, a better image quality is provided (for example, the third embodiment, the fourth embodiment, the fifth embodiment, the sixth embodiment, the seventh embodiment, the ninth embodiment and the tenth embodiment). When Condition 5 is satisfied, the curvature distribution of concave surfaces of the object-side surface 121 and the image-side surface 122 is adjusted to correct the aberrations generated by the first lens element 110 with positive refractive power, thereby, achieving the high resolution of the imaging lens assembly 1. In some embodiments, the second lens element 120 satisfies: $-1<(R_3+R_4)/(R_3-R_4)<-0.3$. When Condition 6 is satisfied, the high order aberration of the imaging lens assembly 10 is corrected. In some embodiments, the fourth lens element 140 satisfies: $0.8<(R_7+R_8)/(R_7-R_8)<1$.

When Condition 7 is satisfied, the third lens element 130 and the fourth lens element 140 have desirable refractive power to correct the aberration of the imaging lens assembly 1, so that the sensitivity of the imaging lens assembly 1 is not excessively high. When Condition 8 is satisfied, preventing the back focal length of the imaging lens assembly 1 from increasing can be achieved while compensating the chromatism. When Condition 9 is satisfied, the space for accommodating lens elements of the imaging lens assembly 1 is balanced, so that the lens spacing is prevented from being not excessively small, resulting in difficult assembly of the imaging lens assembly 1 to affect manufacturing yield rate, or excessively large, making it difficult to achieve the miniaturization of the imaging lens assembly 1.

Furthermore, all lens elements of the imaging lens assembly 1 can be made of glass or plastic. When the lens element is made of glass, there is more freedom in distributing the refractive power of the imaging lens assembly 1. When the lens element is made of plastic, manufacturing cost is effectively reduced. Additionally, any lens element of the imaging lens assembly 1 can be aspheric. Aspheric profiles allow more design-parameter freedom for the aberration elimination so the total optical length of the imaging lens assembly 1 is shortened effectively.

In the imaging lens assembly 1 of the present disclosure, a convex surface of a lens element means the surface of the lens element is convex at a paraxial site. A concave surface of a lens element means the surface of the lens element is concave at a paraxial site.

In addition, at least one stop, such as a glare stop or a field stop, may be disposed within the imaging lens assembly 1 to reduce the occurrence of unwanted rays, to improve the image quality or to adjust the size of the image. The stop can selectively disposed between any two lens elements, in front of the first lens element 110, or after the fourth lens element 140. Furthermore, the imaging lens assembly 1 can be utilized in applications of a three-dimensional optical system.

In the imaging lens assembly 1 of the present disclosure, the specific schemes are further described with the following embodiments. Parameters in the embodiments are defined as follows. Fno is an f-number value of the imaging lens assembly, and HFOV is half of maximal field of view in the imaging lens assembly 1. The aspheric surface in the embodiments may be represented by, but not limited to, the following aspheric surface equation (Condition ASP):

$$X(Y) = (Y^2/R)(1 + sqrt(1 - (1+k)*(Y/R)^2)) + \sum_i (Ai)*(Y^i)$$

Wherein Y is the distance from the point on the curve of the aspheric surface to the optical axis, X is the distance of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, 12, 14 and 16.

The First Embodiment

Embodiment 1

FIG. 1A is a schematic structural view of a first embodiment of an imaging lens assembly according to the present disclosure. The imaging lens assembly 1 comprises, from an object side to an image side along an optical axis (from left to right in FIG. 1A) in sequence, a stop, a first lens element 110, a second lens element 120, a third lens element 130, a fourth lens element 140, an infrared cut filter 150 and an image sensor 170 disposed on an image plane 160. In this embodiment, the stop is, for example, an aperture stop 100.

Additionally in this embodiment, light having the reference wavelength of 587.6 nm is projected on the imaging lens assembly 1.

In this embodiment, the first lens element 110 with positive refractive power has a convex aspheric object-side surface 111 and a convex aspheric image-side surface 112. The second lens element 120 with negative refractive power has a concave aspheric object-side surface 121 and a concave aspheric image-side surface 122. The third lens element 130 with positive refractive power has a concave aspheric object-side surface 131 and a convex aspheric image-side surface 132. The fourth lens element 140 with negative refractive power has a concave aspheric object-side surface 141 and a concave aspheric image-side surface 142. The fourth lens element 140 comprises at least one inflection point.

The detailed data of the imaging lens assembly 1 is as shown in Table 1-1 below.

TABLE 1-1

Embodiment 1
f = 2.18 mm, Fno = 2.60, HFOV = 36.3 deg.

| Surface # | | Curvature Radius | Thickness | Material | Index | Abbe # | Focal length |
|---|---|---|---|---|---|---|---|
| 0 | Object | plano | Infinity | | | | |
| 1 | Ape. Stop | plano | −0.042 | | | | |
| 2 | Lens 1 | 1.245640 (ASP) | 0.407 | Plastic | 1.544 | 55.9 | 2.11 |
| 3 | | −12.658300 (ASP) | 0.246 | | | | |
| 4 | Lens 2 | −2.844210 (ASP) | 0.230 | Plastic | 1.640 | 23.3 | −3.45 |
| 5 | | 10.173400 (ASP) | 0.180 | | | | |
| 6 | Lens 3 | −2.262510 (ASP) | 0.547 | Plastic | 1.544 | 55.9 | 0.98 |
| 7 | | −0.468240 (ASP) | 0.098 | | | | |
| 8 | Lens 4 | −30.655400 (ASP) | 0.308 | Plastic | 1.544 | 55.9 | −1.03 |
| 9 | | 0.574890 (ASP) | 0.500 | | | | |
| 10 | IR-cut filter | plano | 0.150 | Glass | 1.517 | 64.2 | — |
| 11 | | plano | 0.256 | | | | |
| 12 | Image plane | plano | - | | | | |

Note:
Reference wavelength is d-line 587.6 nm

In addition, from the object-side surface 111 to the image-side surface 142, all the surfaces can be aspheric, and the aspheric surfaces can satisfy Condition ASP, but are not limited thereto. As for the parameters of the aspheric surfaces, reference is made to Table 1-2 below:

TABLE 1-2

Aspheric Coefficients

| Surface# | 2 | 3 | 4 | 5 |
|---|---|---|---|---|
| k | −5.65228E−01 | −3.00000E+01 | 8.57049E+00 | −1.00000E+00 |
| $A_4$ | −3.96150E−02 | −3.44468E−01 | −5.12884E−01 | −1.59713E−02 |
| $A_6$ | −7.70707E−01 | −1.19127E+00 | −2.07815E+00 | −6.81873E−01 |
| $A_8$ | 3.82589E+00 | 1.81393E+00 | 1.51369E+00 | −1.25876E+00 |
| $A_{10}$ | −1.45816E+01 | −5.46872E+00 | 9.14414E+00 | 6.29789E+00 |
| $A_{12}$ | −2.51407E+00 | −3.46778E−01 | −1.35906E+00 | −3.80351E+00 |
| $A_{14}$ | −2.54034E−02 | −8.48793E+00 | — | — |

| Surface# | 6 | 7 | 8 | 9 |
|---|---|---|---|---|
| k | 1.45947E+00 | −3.11643E+00 | −1.00000E+00 | −6.68253E+00 |
| $A_4$ | 1.64028E−01 | −5.98585E−01 | −1.66780E−01 | −3.21495E−01 |
| $A_6$ | 3.98271E−01 | 1.20339E+00 | −4.41683E−02 | 3.32552E−01 |
| $A_8$ | 1.75110E+00 | −9.51750E−01 | 2.88529E−01 | −3.22557E−01 |
| $A_{10}$ | −1.35527E+01 | 9.56768E−01 | −1.62456E−01 | 2.20614E−01 |
| $A_{12}$ | 2.70578E+01 | 1.52342E+00 | −2.50769E−03 | −9.35965E−02 |
| $A_{14}$ | −1.52233E+01 | −1.41962E+00 | 2.37794E−02 | 2.07664E−02 |
| $A_{16}$ | −3.68859E+00 | −9.44347E−01 | −4.88725E−03 | −1.60634E−03 |

In Table 1-1, the curvature radius, the thickness and the focal length are shown in millimeters (mm). Surface numbers 0-16 represent the surfaces sequentially arranged from the object-side to the image-side along the optical axis. "f" stands for the focal length, "Fno" is the f-number, and "HFOV" is the half field of view of this embodiment. In Table 1-2, k represents the conic coefficient of the equation of the aspheric surface profiles. A1-A16 represent the aspheric coefficients ranging from the 1st order to the 16th. All labels for Tables of the remaining embodiments share the same definitions as those in Table 1-1 and Table 1-2 of the first embodiment, and their definitions will not be stated again.

The content of Table 1-3 may be deduced from Table 1-1.

TABLE 1-3

Embodiment 1

| | | | |
|---|---|---|---|
| f (mm) | 2.18 | $(R_3 + R_4)/(R_3 - R_4)$ | −0.56 |
| Fno | 2.60 | $(R_7 + R_8)/(R_7 - R_8)$ | 0.96 |
| HFOV(deg.) | 36.3 | $f_3/f_1$ | 0.47 |
| $V_1 - V_2$ | 32.6 | $f_4/f_2$ | 0.30 |
| $T_{12}/CT_2$ | 1.07 | $f/f_3 + |f/f_4|$ | 4.34 |
| $T_{12}/T_{23}$ | 1.37 | SD/TD | 0.98 |

In Table 1-3, the $T_{12}/CT_2$, which is 1.07, of the imaging lens assembly 1 satisfies the Condition 1. The $V_1-V_2$, which is 32.6, of the imaging lens assembly 1 satisfies the Condition 2. The $f_3/f_1$, which is 0.47, of the imaging lens assembly 1 satisfies the Condition 3.

The $(R_3+R_4)/(R_3-R_4)$, which is −0.56, of the imaging lens assembly 1 satisfies the Condition 5. The $(R_7+R_8)/(R_7-R_8)$, which is 0.96, of the imaging lens assembly 1 satisfies the Condition 6. The $f/f_3+|f/f_4|$, which is 4.34, of the imaging lens assembly 1 satisfies the Condition 7. The $f_4/f_2$, which is 0.30, of the imaging lens assembly 1 satisfies the Condition 8. The $T_{12}/T_{23}$, which is 1.37, of the imaging lens assembly 1 satisfies the Condition 9.

Referring to FIG. 1B, FIG. 1B is a graph of longitudinal spherical aberration curves when the lights having wavelengths of 486.1 nm (L), 587.6 nm (M), and 656.3 nm (N) are respectively projected in the imaging lens assembly in FIG. 1A.

Referring to FIG. 1C, FIG. 1C is a schematic view of astigmatic field curves when the light having the wavelength of 587.6 nm is projected in the imaging lens assembly in FIG. 1A.

Referring to FIG. 1D, FIG. 1D is a schematic view of a distortion curve when the light having the wavelength of 587.6 nm is projected in the imaging lens assembly in FIG. 1A.

Regarding the relevant schematic views of the second embodiment to the tenth embodiment, the symbols are substantially the same as that in the first embodiment, which will not be repeated herein for conciseness.

The Second Embodiment

Embodiment 2

Figure 2A:
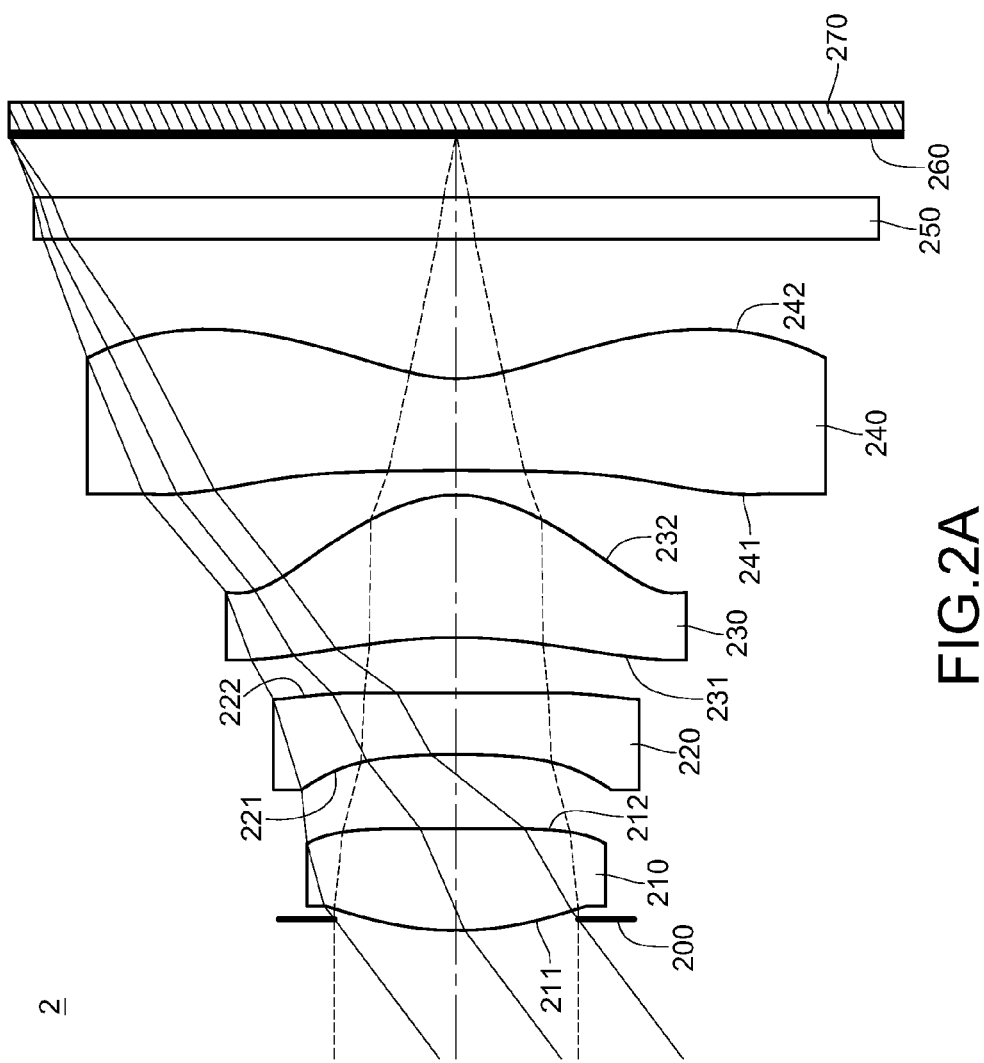
FIG. 2A is a schematic structural view of a second embodiment of a imaging lens assembly according to the present disclosure.

FIG. 2A is a schematic structural view of a second embodiment of an imaging lens assembly according to the present disclosure. The specific implementation is substantially the same as that in the first embodiment, and the elements in the second embodiment are the same as those in the first embodiment, so that the element symbols all begin with "2" as the hundredth digit, which represents that the elements have the same function or structure. For the sake of conciseness, only the differences are illustrated below, and the similar parts will not be repeated herein.

In this embodiment, the first lens element 210 with positive refractive power has a convex aspheric object-side surface 211 and a concave aspheric image-side surface 212. The second lens element 220 with negative refractive power has a concave aspheric object-side surface 221 and a concave aspheric image-side surface 222. The third lens element 230 with positive refractive power has a concave aspheric object-side surface 231 and a convex aspheric image-side surface 232. The fourth lens element 240 with negative refractive power has a concave aspheric object-side surface 241 and a concave aspheric image-side surface 242. The fourth lens element 240 comprises at least one inflection point.

The detailed data of the imaging lens assembly 2 is as shown in Table 2-1 below.

TABLE 2-1

Embodiment 2
f = 2.14 mm, Fno = 2.45, HFOV = 36.9 deg.

| Surface # | | Curvature Radius | Thickness | Material | Index | Abbe # | Focal length |
|---|---|---|---|---|---|---|---|
| 0 | Object | plano | Infinity | | | | |
| 1 | Ape. Stop | plano | −0.040 | | | | |
| 2 | Lens 1 | 1.158150 (ASP) | 0.365 | Plastic | 1.544 | 55.9 | 2.18 |
| 3 | | 41.102500 (ASP) | 0.266 | | | | |
| 4 | Lens 2 | −3.226100 (ASP) | 0.220 | Plastic | 1.650 | 21.4 | −4.46 |
| 5 | | 28.985500 (ASP) | 0.199 | | | | |
| 6 | Lens 3 | −1.932850 (ASP) | 0.511 | Plastic | 1.544 | 55.9 | 1.01 |
| 7 | | −0.467790 (ASP) | 0.087 | | | | |
| 8 | Lens 4 | −42.359300 (ASP) | 0.330 | Plastic | 1.544 | 55.9 | −1.04 |
| 9 | | 0.576130 (ASP) | 0.500 | | | | |
| 10 | IR-cut filter | plano | 0.150 | Glass | 1.517 | 64.2 | — |
| 11 | | plano | 0.214 | | | | |
| 12 | Image plane | plano | — | | | | |

Note:
Reference wavelength is d-line 587.6 nm

In addition, from the object-side surface 211 to the image-side surface 242, all the surfaces can be aspheric, and the aspheric surfaces can satisfy Condition ASP, but are not limited thereto. As for the parameters of the aspheric surfaces, reference is made to Table 2-2 below:

TABLE 2-2

Aspheric Coefficients

| Surface# | 2 | 3 | 4 | 5 |
|---|---|---|---|---|
| k | −5.25929E−01 | −2.99491E+01 | 3.00000E+00 | −1.00000E+00 |
| $A_4$ | −3.66511E−02 | −3.35430E−01 | −5.26234E−01 | −2.31049E−02 |
| $A_6$ | −7.52672E−01 | −1.15583E+00 | −2.08740E+00 | −6.92096E−01 |
| $A_8$ | 3.72569E+00 | 1.66508E+00 | 1.31909E+00 | −1.24144E+00 |
| $A_{10}$ | −1.48952E+01 | −6.18533E+00 | 8.34227E+00 | 6.40601E+00 |
| $A_{12}$ | −2.53139E+00 | −3.41071E+00 | −2.35877E+00 | −3.55060E+00 |
| $A_{14}$ | −6.93975E−02 | −7.99059E+00 | — | — |

| Surface# | 6 | 7 | 8 | 9 |
|---|---|---|---|---|
| k | 1.52997E+00 | −3.07718E+00 | −1.00000E+00 | −6.56964E+00 |
| $A_4$ | 1.58449E−01 | −6.05718E−01 | −1.72059E−01 | −3.11352E−01 |
| $A_6$ | 4.04609E−01 | 1.19861E+00 | −4.40430E−02 | 3.26212E−01 |
| $A_8$ | 1.76597E+00 | −9.60538E−01 | 2.89331E−01 | −3.23137E−01 |
| $A_{10}$ | −1.35454E+01 | 9.45543E−01 | −1.61892E−01 | 2.20942E−01 |
| $A_{12}$ | 2.70318E+01 | 1.51460E+00 | −2.23819E−03 | −9.34469E−02 |
| $A_{14}$ | −1.53108E+01 | −1.41912E+00 | 2.38254E−02 | 2.07722E−02 |
| $A_{16}$ | −3.84605E+00 | −9.21911E−01 | −5.12763E−03 | −1.64572E−03 |

The content of Table 2-3 may be deduced from Table 2-1.

TABLE 2-3

Embodiment 2

| f (mm) | 2.14 | $(R_3 + R_4)/(R_3 − R_4)$ | −0.80 |
|---|---|---|---|
| Fno | 2.45 | $(R_7 + R_8)/(R_7 − R_8)$ | 0.97 |
| HFOV(deg.) | 36.9 | $f_3/f_1$ | 0.46 |
| $V_1 − V_2$ | 34.5 | $f_4/f_2$ | 0.23 |
| $T_{12}/CT_2$ | 1.21 | $f/f_3 + |f/f_4|$ | 4.17 |
| $T_{12}/T_{23}$ | 1.34 | SD/TD | 0.98 |

The Third Embodiment

Embodiment 3

Figure 3A:
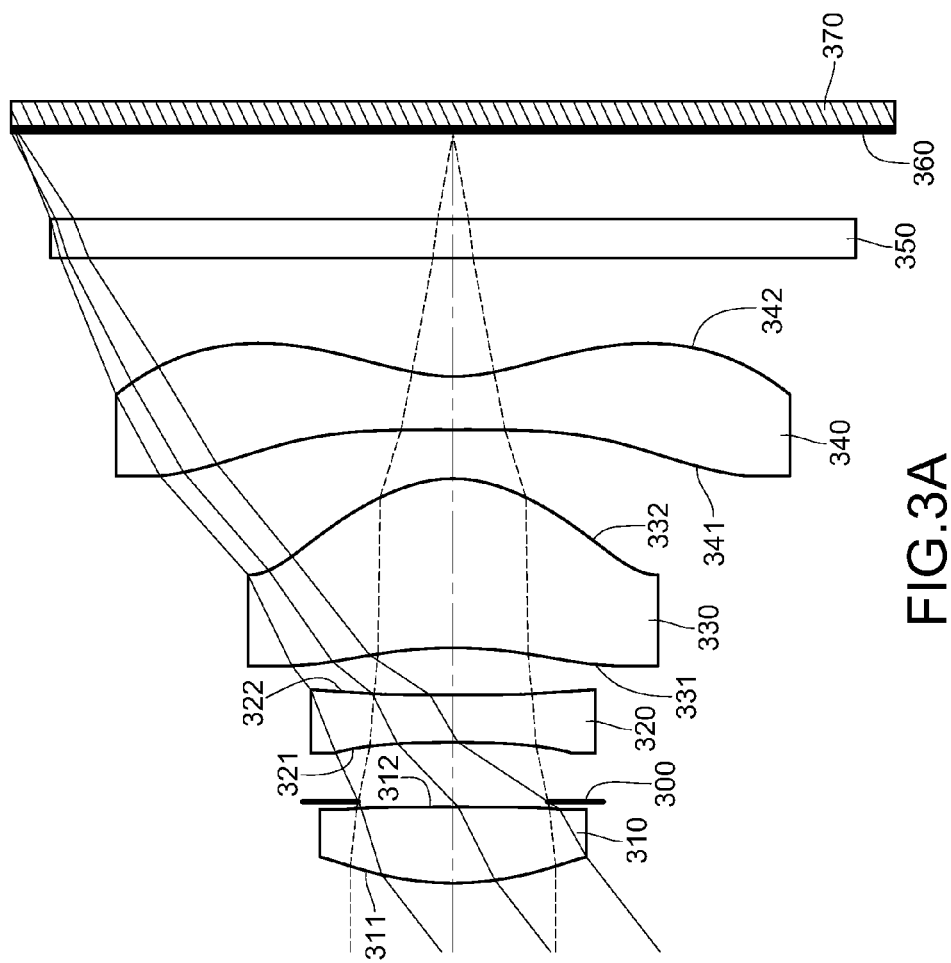
FIG. 3A is a schematic structural view of a third embodiment of a imaging lens assembly according to the present disclosure.

FIG. 3A is a schematic structural view of a third embodiment of an imaging lens assembly according to the present disclosure. The specific implementation is substantially the same as that in the first embodiment, and the elements in the third embodiment are the same as those in the first embodiment, so that the element symbols all begin with "3" as the hundredth digit, which represents that the elements have the same function or structure. For the sake of conciseness, only the differences are illustrated below, and the similar parts will not be repeated herein.

In this embodiment, the first lens element 310 with positive refractive power has a convex aspheric object-side surface 311 and a convex aspheric image-side surface 312. The second lens element 320 with negative refractive power has a concave aspheric object-side surface 321 and a concave aspheric image-side surface 322. The third lens element 330 with positive refractive power has a concave aspheric object-side surface 331 and a convex aspheric image-side surface 332. The fourth lens element 340 with negative refractive power has a concave aspheric object-side surface 341 and a concave aspheric image-side surface 342. The fourth lens element 340 comprises at least one inflection point.

The detailed data of the imaging lens assembly 3 is as shown in Table 3-1 below.

TABLE 3-1

Embodiment 3
f = 2.86 mm, Fno = 2.75, HFOV = 37.8 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 1.571050 (ASP) | 0.387 | Plastic | 1.544 | 55.9 | 2.83 |
| 2 | | −76.923100 (ASP) | 0.027 | | | | |
| 3 | Ape. Stop | plano | 0.301 | | | | |
| 4 | Lens 2 | −4.994300 (ASP) | 0.240 | Plastic | 1.632 | 23.4 | −7.00 |
| 5 | | 39.215700 (ASP) | 0.240 | | | | |
| 6 | Lens 3 | −2.205070 (ASP) | 0.859 | Plastic | 1.530 | 55.8 | 1.46 |
| 7 | | −0.648960 (ASP) | 0.248 | | | | |
| 8 | Lens 4 | −83.333300 (ASP) | 0.270 | Plastic | 1.544 | 55.9 | −1.54 |
| 9 | | 0.847940 (ASP) | 0.600 | | | | |
| 10 | IR-cut filter | plano | 0.200 | Glass | 1.517 | 64.2 | — |
| 11 | | plano | 0.438 | | | | |
| 12 | Image plane | plano | — | | | | |

Note:
Reference wavelength is d-line 587.6 nm

In addition, from the object-side surface 311 to the image-side surface 342, all the surfaces can be aspheric, and the aspheric surfaces can satisfy Condition ASP, but are not limited thereto. As for the parameters of the aspheric surfaces, reference is made to Table 3-2 below:

TABLE 3-2

Aspheric Coefficients

| Surface# | 1 | 2 | 4 | 5 |
|---|---|---|---|---|
| k | −1.30111E+01 | −3.00000E+01 | −7.46425E−15 | −3.00000E+01 |
| $A_4$ | 4.06171E−01 | −6.31650E−02 | −3.87128E−02 | 2.37494E−01 |
| $A_6$ | −9.61192E−01 | −4.98515E−02 | 7.44394E−01 | −6.28758E−01 |
| $A_8$ | 1.87849E+00 | −9.39096E−01 | −9.93265E+00 | 2.20204E+00 |
| $A_{10}$ | −3.02284E+00 | 3.21591E+00 | 4.16017E+01 | −7.66040E+00 |
| $A_{12}$ | 1.71184E+00 | −1.12070E+01 | −8.85109E+01 | 1.32420E+01 |
| $A_{14}$ | −3.88037E−01 | 1.82626E+01 | 7.68544E+01 | −8.59526E+00 |

| Surface# | 6 | 7 | 8 | 9 |
|---|---|---|---|---|
| k | 5.48566E+00 | −3.94928E+00 | −3.00000E+01 | −7.43340E+00 |
| $A_4$ | 1.14570E−01 | −5.36868E−01 | −1.69280E−01 | −1.75538E−01 |
| $A_6$ | 3.54430E−01 | 1.01953E+00 | 4.30468E−02 | 9.02301E−02 |
| $A_8$ | −1.36892E+00 | −1.46947E+00 | 3.94513E−02 | −3.75086E−02 |
| $A_{10}$ | 5.18103E+00 | 1.27559E+00 | −2.55923E−02 | 9.15496E−03 |
| $A_{12}$ | −7.99428E+00 | −3.10984E−01 | 5.79002E−03 | −1.12141E−03 |
| $A_{14}$ | 4.60431E+00 | −6.08606E−02 | −4.88565E−04 | 4.50692E−05 |

The content of Table 3-3 may be deduced from Table 3-1.

TABLE 3-3

Embodiment 3

| f (mm) | 2.86 | $(R_3 + R_4)/(R_3 − R_4)$ | −0.77 |
|---|---|---|---|
| Fno | 2.75 | $(R_7 + R_8)/(R_7 − R_8)$ | 0.98 |
| HFOV(deg.) | 37.8 | $f_3/f_1$ | 0.51 |
| $V_1 − V_2$ | 32.5 | $f_4/f_2$ | 0.22 |
| $T_{12}/CT_2$ | 1.37 | $f/f_3 + |f/f_4|$ | 3.83 |
| $T_{12}/T_{23}$ | 1.37 | SD/TD | 0.84 |

The Fourth Embodiment

Embodiment 4

Figure 4A:
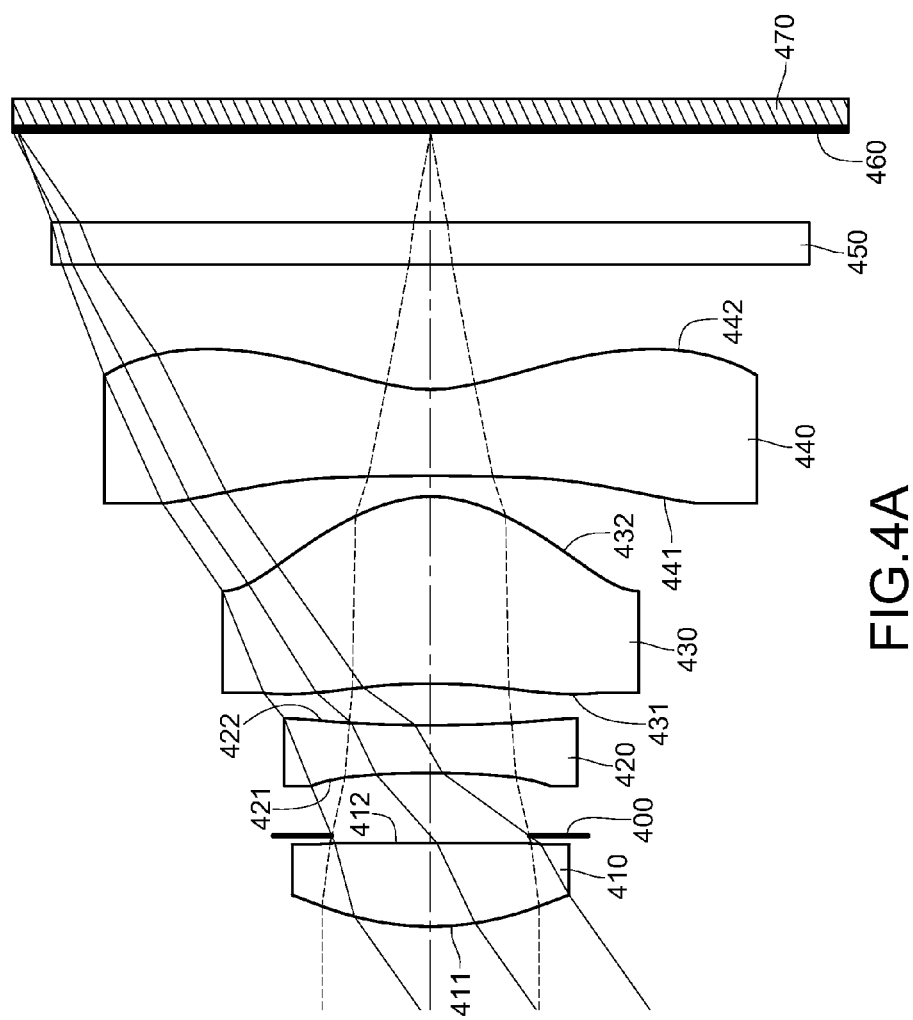
FIG. 4A is a schematic structural view of a fourth embodiment of a imaging lens assembly according to the present disclosure.

FIG. 4A is a schematic structural view of a fourth embodiment of an imaging lens assembly according to the present disclosure. The specific implementation is substantially the same as that in the fourth embodiment, and the elements in the fourth embodiment are the same as those in the first embodiment, so that the element symbols all begin with "4" as the hundredth digit, which represents that the elements have the same function or structure. For the sake of conciseness, only the differences are illustrated below, and the similar parts will not be repeated herein.

In this embodiment, the first lens element 410 with positive refractive power has a convex aspheric object-side surface 411 and a concave aspheric image-side surface 412. The second lens element 420 with negative refractive power has a concave aspheric object-side surface 421 and a concave aspheric image-side surface 422. The third lens element 430 with positive refractive power has a concave aspheric object-side surface 431 and a convex aspheric image-side surface 432. The fourth lens element 440 with negative refractive power has a concave aspheric object-side surface 441 and a concave aspheric image-side surface 442. The fourth lens element 440 comprises at least one inflection point.

The detailed data of the imaging lens assembly 4 is as shown in Table 4-1 below.

TABLE 4-1

Embodiment 4
f = 2.81 mm, Fno = 2.70, HFOV = 35.2 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 1.418870 (ASP) | 0.399 | Plastic | 1.544 | 55.9 | 2.74 |
| 2 | | 26.512000 (ASP) | 0.035 | | | | |
| 3 | Ape. Stop | plano | 0.301 | | | | |
| 4 | Lens 2 | −5.350100 (ASP) | 0.230 | Plastic | 1.607 | 26.6 | −5.61 |
| 5 | | 9.523800 (ASP) | 0.200 | | | | |
| 6 | Lens 3 | −2.530980 (ASP) | 0.896 | Plastic | 1.534 | 55.1 | 1.31 |
| 7 | | −0.613670 (ASP) | 0.099 | | | | |
| 8 | Lens 4 | −40.816300 (ASP) | 0.415 | Plastic | 1.534 | 55.1 | −1.43 |
| 9 | | 0.779530 (ASP) | 0.600 | | | | |
| 10 | IR-cut filter | plano | 0.200 | Glass | 1.517 | 64.2 | — |
| 11 | | plano | 0.433 | | | | |
| 12 | Image plane | plano | — | | | | |

Note:
Reference wavelength is d-line 587.6 nm

In addition, from the object-side surface 411 to the image-side surface 442, all the surfaces can be aspheric, and the aspheric surfaces can satisfy Condition ASP, but are not limited thereto. As for the parameters of the aspheric surfaces, reference is made to Table 4-2 below:

TABLE 4-2

Aspheric Coefficients

| Surface # | 1 | 2 |
|---|---|---|
| k | −1.15591E+01 | 2.34394E−12 |
| $A_4$ | 4.85080E−01 | −4.06348E−02 |
| $A_6$ | −9.93869E−01 | −2.85251E−01 |
| $A_8$ | 1.82099E+00 | 6.89055E−02 |
| $A_{10}$ | −2.91118E+00 | 2.35979E+00 |
| $A_{12}$ | 2.03504E+00 | −2.01508E+01 |
| $A_{14}$ | −1.32674E+00 | 3.80088E+01 |

| Surface # | 4 | 5 |
|---|---|---|
| k | 6.74240E−15 | −3.00000E+01 |
| $A_4$ | −1.34833E−01 | 1.96603E−01 |
| $A_6$ | 3.55726E−01 | −6.21390E−01 |
| $A_8$ | −8.75937E+00 | 2.11604E+00 |
| $A_{10}$ | 4.10638E+01 | −7.54443E+00 |
| $A_{12}$ | −1.00158E+02 | 1.36027E+01 |
| $A_{14}$ | 9.98312E+01 | −9.19609E+00 |

| Surface # | 6 | 7 |
|---|---|---|
| k | 7.67658E+00 | −3.80986E+00 |
| $A_4$ | 1.42341E−01 | −4.96734E−01 |
| $A_6$ | 5.42665E−01 | 1.00693E+00 |
| $A_8$ | −1.62682E+00 | −1.46397E+00 |
| $A_{10}$ | 5.05435E+00 | 1.30892E+00 |
| $A_{12}$ | −7.72734E+00 | −2.99454E−01 |
| $A_{14}$ | 4.53823E+00 | −9.24040E−02 |

| Surface # | 8 | 9 |
|---|---|---|
| k | −3.00000E+01 | −7.47240E+00 |
| $A_4$ | −1.13259E−01 | −1.54606E−01 |
| $A_6$ | 2.15181E−02 | 8.81597E−02 |
| $A_8$ | 4.19367E−02 | −4.07696E−02 |
| $A_{10}$ | −2.50837E−02 | 1.01077E−02 |
| $A_{12}$ | 5.65376E−03 | −1.04382E−03 |
| $A_{14}$ | −5.51160E−04 | −1.23202E−05 |

The content of Table 4-3 may be deduced from Table 4-1.

TABLE 4-3

Embodiment 4

| f (mm) | 2.81 | $(R_3 + R_4)/(R_3 − R_4)$ | −0.28 |
|---|---|---|---|
| Fno | 2.70 | $(R_7 + R_8)/(R_7 − R_8)$ | 0.96 |
| HFOV (deg.) | 35.2 | $f_3/f_1$ | 0.48 |
| $V_1 − V_2$ | 29.3 | $f_4/f_2$ | 0.25 |
| $T_{12}/CT_2$ | 1.46 | $f/f_3 + |f/f_4|$ | 4.11 |
| $T_{12}/T_{23}$ | 1.68 | SD/TD | 0.83 |

The Fifth Embodiment

Embodiment 5

Figure 5A:
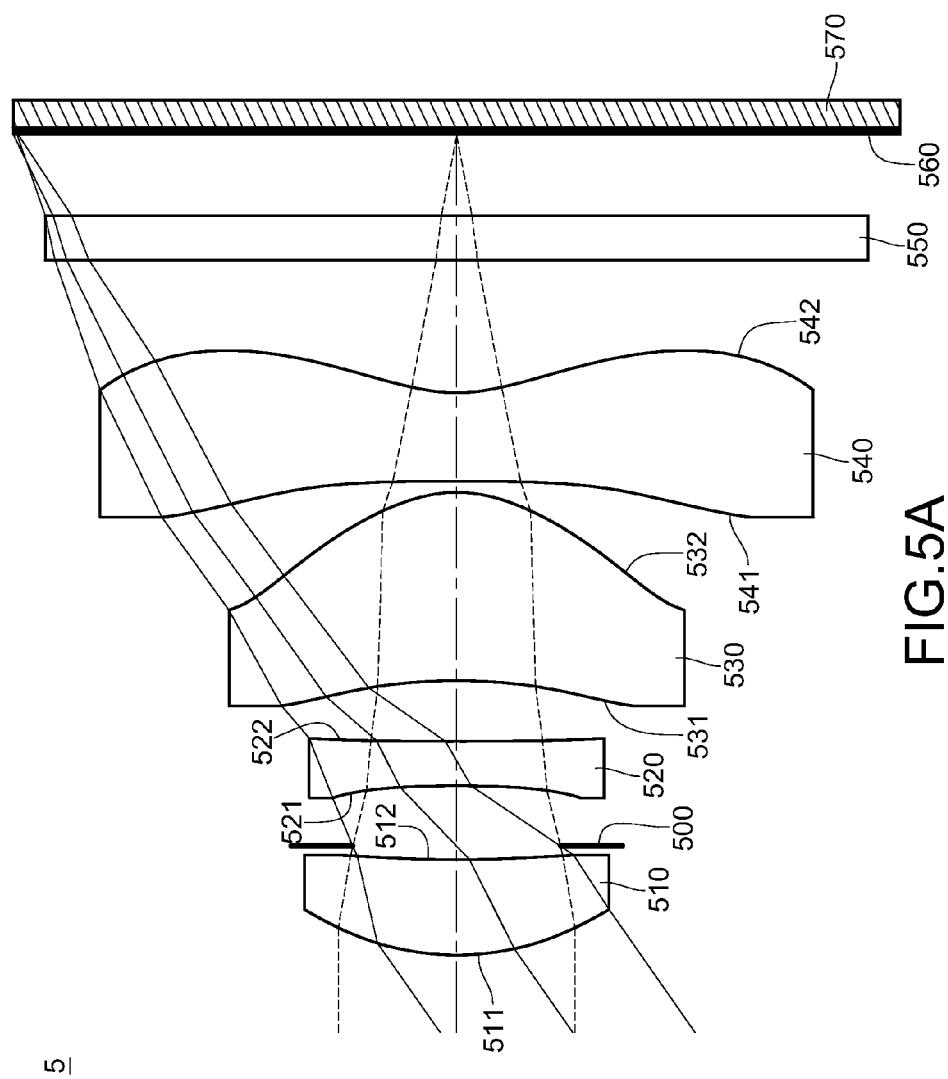
FIG. 5A is a schematic structural view of a fifth embodiment of a imaging lens assembly according to the present disclosure.
Figures 5B, 5C, 5D:
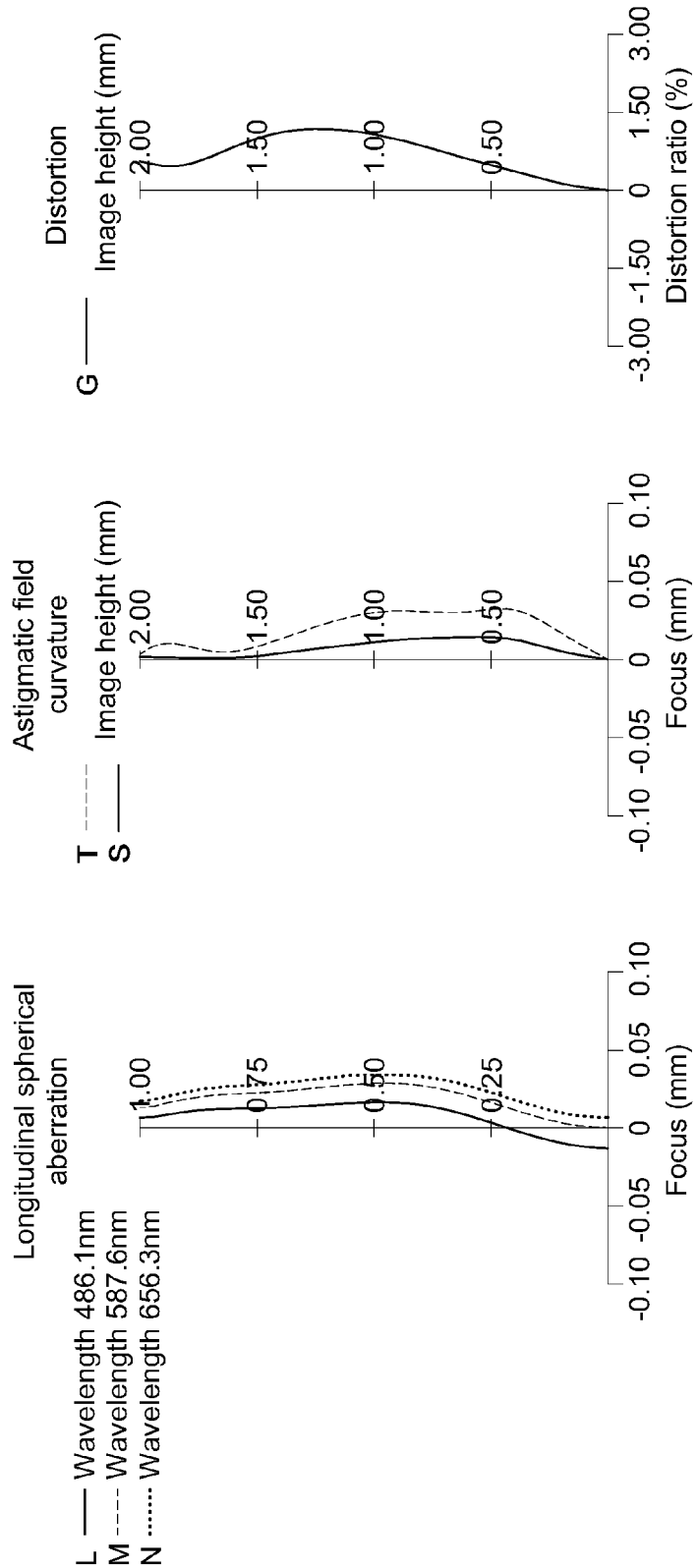
FIG. 5B, FIG. 5C, FIG. 5D are schematic views of longitudinal spherical aberration curves, astigmatic field curves, and a distortion curve, respectively in the imaging lens assembly in FIG. 5A.

FIG. 5A is a schematic structural view of a fifth embodiment of an imaging lens assembly according to the present disclosure. The specific implementation is substantially the same as that in the first embodiment, and the elements in the fifth embodiment are the same as those in the first embodiment, so that the element symbols all begin with "5" as the hundredth digit, which represents that the elements have the same function or structure. For the sake of conciseness, only the differences are illustrated below, and the similar parts will not be repeated herein.

In this embodiment, the first lens element 510 with positive refractive power has a convex aspheric object-side surface 511 and a concave aspheric image-side surface 512. The second lens element 520 with negative refractive power has a concave aspheric object-side surface 521 and a concave aspheric image-side surface 522. The third lens element 530 with positive refractive power has a concave aspheric object-side surface 531 and a convex aspheric image-side surface 532. The fourth lens element 540 with negative refractive power has a concave aspheric object-side surface 541 and a concave aspheric image-side surface 542. The fourth lens element 540 comprises at least one inflection point.

The detailed data of the imaging lens assembly 5 is as shown in Table 5-1 below.

TABLE 5-1

Embodiment 5
f = 2.83 mm, Fno = 2.65, HFOV = 35.0 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 1.225130 (ASP) | 0.430 | Glass | 1.569 | 71.3 | 2.71 |
| 2 | | 5.168400 (ASP) | 0.061 | | | | |
| 3 | Ape. Stop | Plano | 0.273 | | | | |
| 4 | Lens 2 | −5.493300 (ASP) | 0.200 | Plastic | 1.640 | 23.3 | −6.79 |
| 5 | | 21.052600 (ASP) | 0.275 | | | | |
| 6 | Lens 3 | −2.446140 (ASP) | 0.850 | Plastic | 1.544 | 55.9 | 1.23 |
| 7 | | −0.589450 (ASP) | 0.050 | | | | |
| 8 | Lens 4 | −31.250000 (ASP) | 0.399 | Plastic | 1.544 | 55.9 | −1.29 |
| 9 | | 0.719900 (ASP) | 0.600 | | | | |
| 10 | IR-cut filter | plano | 0.200 | Glass | 1.517 | 64.2 | — |
| 11 | | plano | 0.367 | | | | |
| 12 | Image plane | plano | — | | | | |

Note:
Reference wavelength is d-line 587.6 nm

In addition, from the object-side surface 511 to the image-side surface 542, all the surfaces can be aspheric, and the aspheric surfaces can satisfy Condition ASP, but are not limited thereto. As for the parameters of the aspheric surfaces, reference is made to Table 5-2 below:

TABLE 5-2

Aspheric Coefficients

| Surface # | 1 | 2 |
|---|---|---|
| k | −8.72302E+00 | −1.45937E+01 |
| $A_4$ | 5.85386E−01 | 4.24171E−03 |
| $A_6$ | −1.03370E+00 | −4.16171E−01 |
| $A_8$ | 1.90472E+00 | 7.53854E−01 |
| $A_{10}$ | −2.54783E+00 | 4.66758E+00 |
| $A_{12}$ | 1.89741E+00 | −3.83481E+01 |
| $A_{14}$ | −1.42880E+00 | 6.55804E+01 |

| Surface # | 4 | 5 |
|---|---|---|
| k | 1.78895E−16 | −3.00000E+01 |
| $A_4$ | −2.00849E−01 | 3.35027E−02 |
| $A_6$ | 5.11806E−01 | −2.46519E−01 |
| $A_8$ | −7.77531E+00 | 1.66322E+00 |
| $A_{10}$ | 3.77571E+01 | −6.86968E+00 |
| $A_{12}$ | −9.48610E+01 | 1.48557E+01 |
| $A_{14}$ | 9.35607E+01 | −1.19147E+01 |

| Surface # | 6 | 7 |
|---|---|---|
| k | 7.18988E+00 | −4.03180E+00 |
| $A_4$ | −7.01950E−04 | −5.18019E−01 |
| $A_6$ | 3.99547E−01 | 9.97164E−01 |
| $A_8$ | −1.71906E+00 | −1.49280E+00 |
| $A_{10}$ | 5.49143E+00 | 1.26905E+00 |
| $A_{12}$ | −7.14210E+00 | −3.13582E−01 |
| $A_{14}$ | 3.70240E+00 | −5.23635E−02 |

| Surface # | 8 | 9 |
|---|---|---|
| k | −1.59271E+01 | −7.60698E+00 |
| $A_4$ | −1.44445E−01 | −1.67061E−01 |
| $A_6$ | 4.04786E−02 | 1.00632E−01 |
| $A_8$ | 4.37325E−02 | −4.78807E−02 |
| $A_{10}$ | −2.75077E−02 | 1.11600E−02 |
| $A_{12}$ | 5.10270E−03 | −6.44249E−04 |
| $A_{14}$ | −2.90648E−04 | −1.20078E−04 |

The content of Table 5-3 may be deduced from Table 5-1.

TABLE 5-3

Embodiment 5

| f (mm) | 2.83 | $(R_3 + R_4)/(R_3 − R_4)$ | −0.59 |
|---|---|---|---|
| Fno | 2.65 | $(R_7 + R_8)/(R_7 − R_8)$ | 0.95 |
| HFOV (deg.) | 35.0 | $f_3/f_1$ | 0.45 |
| $V_1 − V_2$ | 48.0 | $f_4/f_2$ | 0.19 |
| $T_{12}/CT_2$ | 1.67 | $f/f_3 + |f/f_4|$ | 4.50 |
| $T_{12}/T_{23}$ | 1.21 | SD/TD | 0.81 |

The Sixth Embodiment

Embodiment 6

Figure 6A:
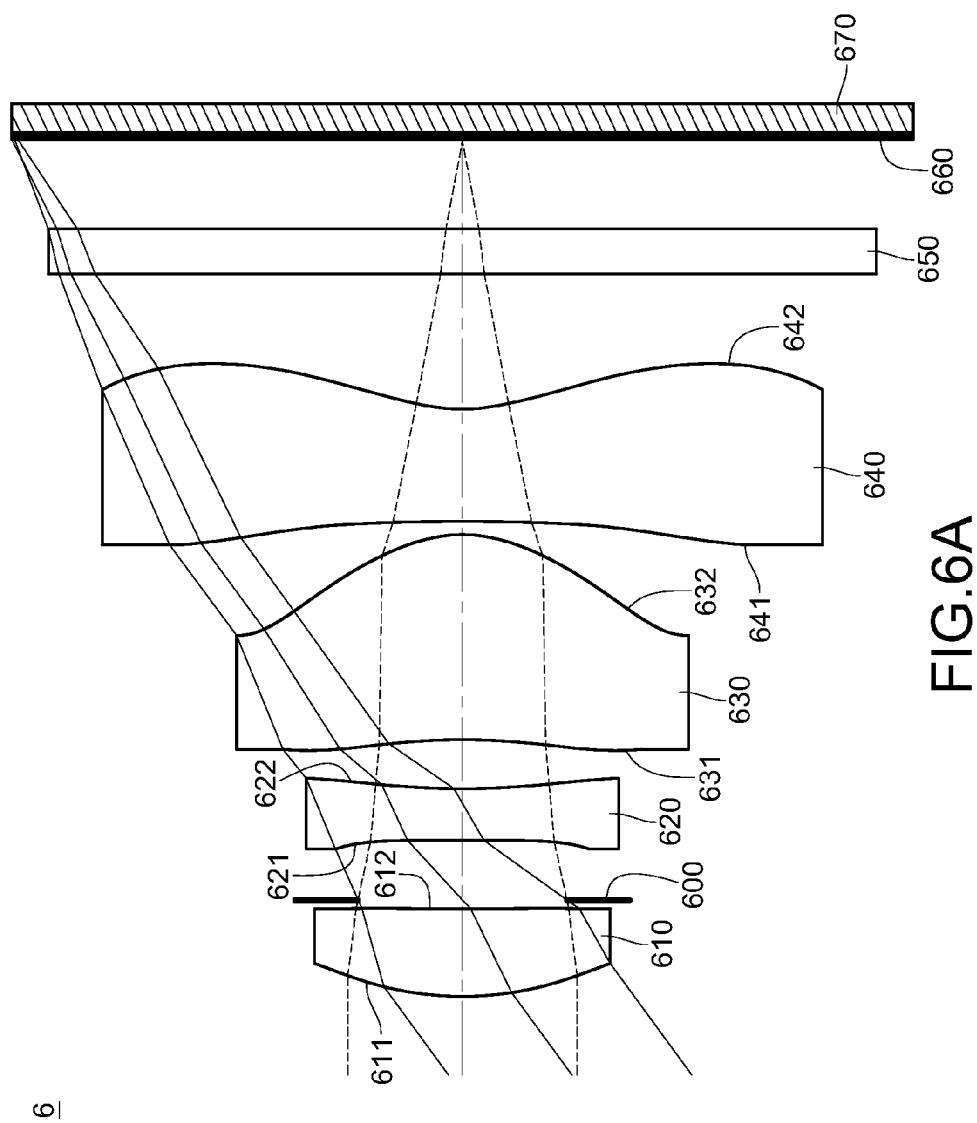
FIG. 6A is a schematic structural view of a sixth embodiment of a imaging lens assembly according to the present disclosure.

FIG. 6A is a schematic structural view of a sixth embodiment of an imaging lens assembly according to the present disclosure. The specific implementation is substantially the same as that in the first embodiment, and the elements in the sixth embodiment are the same as those in the first embodiment, so that the element symbols all begin with "6" as the hundredth digit, which represents that the elements have the same function or structure. For the sake of conciseness, only the differences are illustrated below, and the similar parts will not be repeated herein.

In this embodiment, the first lens element 610 with positive refractive power has a convex aspheric object-side surface 611 and a concave aspheric image-side surface 612. The second lens element 620 with negative refractive power has a convex aspheric object-side surface 621 and a concave aspheric image-side surface 622. The third lens element 630 with positive refractive power has a concave aspheric object-side surface 631 and a convex aspheric image-side surface 632. The fourth lens element 640 with negative refractive power has a concave aspheric object-side surface 641 and a concave aspheric image-side surface 642. The fourth lens element 640 comprises at least one inflection point.

The detailed data of the imaging lens assembly 6 is as shown in Table 6-1 below.

TABLE 6-1

Embodiment 6
f = 2.75 mm, Fno = 2.70, HFOV = 36.1 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 1.417030 (ASP) | 0.389 | Plastic | 1.544 | 55.9 | 2.92 |
| 2 | | 11.972700 (ASP) | 0.040 | | | | |
| 3 | Ape. Stop | plano | 0.264 | | | | |
| 4 | Lens 2 | 28.571400 (ASP) | 0.230 | Plastic | 1.634 | 23.8 | −6.11 |
| 5 | | 3.400400 (ASP) | 0.218 | | | | |
| 6 | Lens 3 | −2.772240 (ASP) | 0.911 | Plastic | 1.544 | 55.9 | 1.26 |
| 7 | | −0.614150 (ASP) | 0.058 | | | | |
| 8 | Lens 4 | −18.181800 (ASP) | 0.500 | Plastic | 1.544 | 55.9 | −1.38 |
| 9 | | 0.792800 (ASP) | 0.600 | | | | |
| 10 | IR-cut filter | plano | 0.200 | Glass | 1.517 | 64.2 | — |
| 11 | | plano | 0.398 | | | | |
| 12 | Image plane | plano | — | | | | |

Note:
Reference wavelength is d-line 587.6 nm

In addition, from the object-side surface 611 to the image-side surface 642, all the surfaces can be aspheric, and the aspheric surfaces can satisfy Condition ASP, but are not limited thereto. As for the parameters of the aspheric surfaces, reference is made to Table 6-2 below:

TABLE 6-2

Aspheric Coefficients

| Surface # | 1 | 2 |
|---|---|---|
| k | −1.22323E+01 | −9.98978E+00 |
| $A_4$ | 5.10029E−01 | −7.22133E−02 |
| $A_6$ | −1.06088E+00 | −2.34860E−01 |
| $A_8$ | 1.84196E+00 | −3.41822E−01 |
| $A_{10}$ | −2.75890E+00 | 3.07991E+00 |
| $A_{12}$ | 1.80386E+00 | −2.01508E+01 |
| $A_{14}$ | −1.52815E+00 | 3.80088E+01 |

| Surface # | 4 | 5 |
|---|---|---|
| k | −1.00000E+00 | −3.00000E+01 |
| $A_4$ | −2.95914E−01 | 9.10533E−02 |
| $A_6$ | 3.40865E−01 | −6.07030E−01 |
| $A_8$ | −8.28632E+00 | 2.09979E+00 |
| $A_{10}$ | 3.95223E+01 | −7.26054E+00 |
| $A_{12}$ | −9.87400E+01 | 1.36069E+01 |
| $A_{14}$ | 9.98312E+01 | −9.86533E+00 |

| Surface # | 6 | 7 |
|---|---|---|
| k | 9.65883E+00 | −3.69223E+00 |
| $A_4$ | 8.50358E−02 | −4.89251E−01 |
| $A_6$ | 6.29569E−01 | 1.00204E+00 |
| $A_8$ | −1.64858E+00 | −1.46165E+00 |
| $A_{10}$ | 4.97240E+00 | 1.32361E+00 |
| $A_{12}$ | −7.68069E+00 | −2.93690E−01 |
| $A_{14}$ | 4.57393E+00 | −1.06183E−01 |

| Surface # | 8 | 9 |
|---|---|---|
| k | −3.00000E+01 | −7.50404E+00 |
| $A_4$ | −8.03293E−02 | −1.42644E−01 |
| $A_6$ | 5.77086E−03 | 8.32178E−02 |
| $A_8$ | 4.89152E−02 | −3.99356E−02 |
| $A_{10}$ | −2.58314E−02 | 1.05548E−02 |
| $A_{12}$ | 4.83545E−03 | −1.27251E−03 |
| $A_{14}$ | −3.32426E−04 | 2.77095E−05 |

The content of Table 6-3 may be deduced from Table 6-1.

TABLE 6-3

| Embodiment 6 | | | |
|---|---|---|---|
| f (mm) | 2.75 | $(R_3 + R_4)/(R_3 − R_4)$ | 1.27 |
| Fno | 2.70 | $(R_7 + R_8)/(R_7 − R_8)$ | 0.92 |
| HFOV (deg.) | 36.1 | $f_3/f_1$ | 0.43 |
| $V_1 − V_2$ | 32.1 | $f_4/f_2$ | 0.23 |
| $T_{12}/CT_2$ | 1.32 | $f/f_3 + |f/f_4|$ | 4.16 |
| $T_{12}/T_{23}$ | 1.39 | SD/TD | 0.84 |

The Seventh Embodiment

Embodiment 7

Figure 7A:
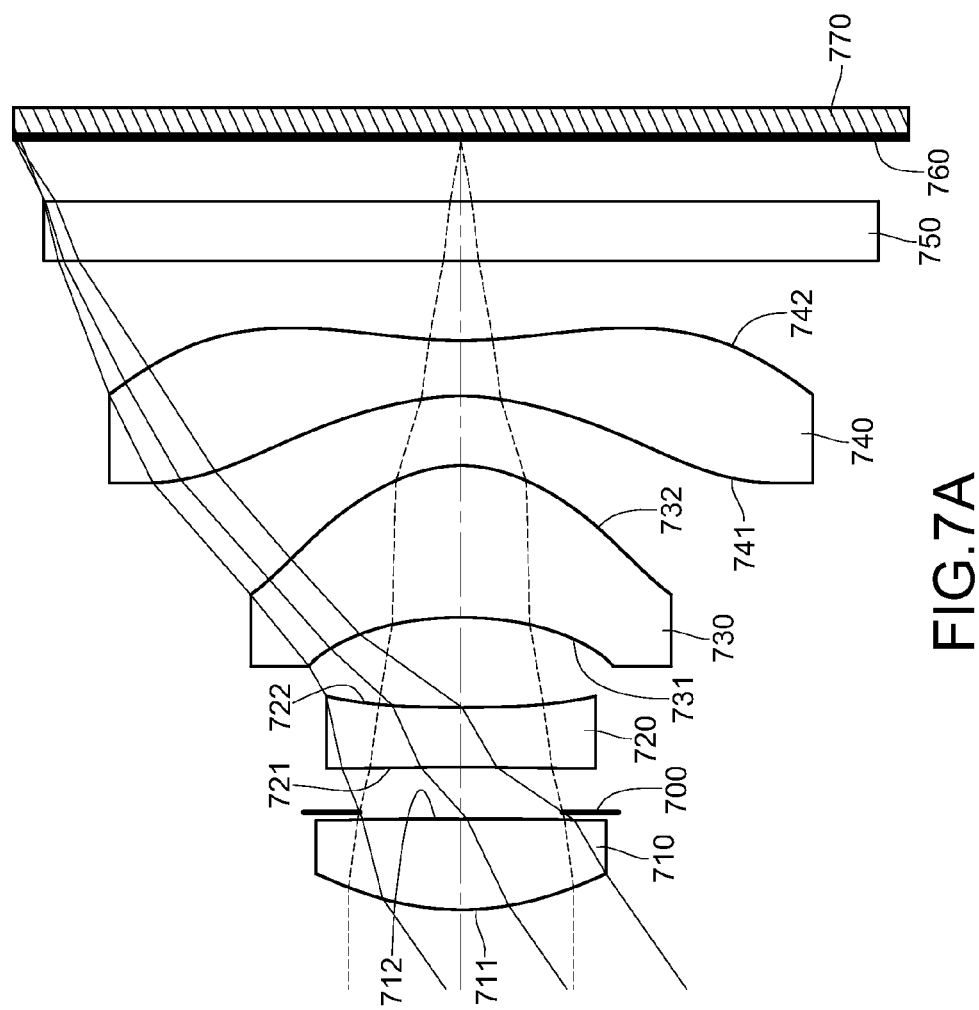
FIG. 7A is a schematic structural view of a seventh embodiment of a imaging lens assembly according to the present disclosure.

FIG. 7A is a schematic structural view of a seventh embodiment of an imaging lens assembly according to the present disclosure. The specific implementation is substantially the same as that in the first embodiment, and the elements in the seventh embodiment are the same as those in the first embodiment, so that the element symbols all begin with "7" as the hundredth digit, which represents that the elements have the same function or structure. For the sake of conciseness, only the differences are illustrated below, and the similar parts will not be repeated herein.

In this embodiment, the first lens element 710 with positive refractive power has a convex aspheric object-side surface 711 and a convex aspheric image-side surface 712. The second lens element 720 with negative refractive power has a concave aspheric object-side surface 721 and a concave aspheric image-side surface 722. The third lens element 730 with positive refractive power has a concave aspheric object-side surface 731 and a convex aspheric image-side surface 732. The fourth lens element 740 with negative refractive power has a concave aspheric object-side surface 741 and a concave aspheric image-side surface 742. The fourth lens element 740 comprises at least one inflection point.

The detailed data of the imaging lens assembly 7 is as shown in Table 7-1 below.

TABLE 7-1

Embodiment 7
f = 3.18 mm, Fno = 2.82, HFOV = 34.9 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 1.431690 (ASP) | 0.457 | Plastic | 1.544 | 55.9 | 2.60 |
| 2 | | −100.000000 (ASP) | 0.033 | | | | |
| 3 | Ape. Stop | plano | 0.226 | | | | |
| 4 | Lens 2 | −10.714700 (ASP) | 0.300 | Plastic | 1.632 | 23.4 | −7.99 |
| 5 | | 9.649600 (ASP) | 0.452 | | | | |
| 6 | Lens 3 | −1.785250 (ASP) | 0.763 | Plastic | 1.530 | 55.8 | 1.64 |
| 7 | | −0.670480 (ASP) | 0.349 | | | | |
| 8 | Lens 4 | −1.173220 (ASP) | 0.280 | Plastic | 1.544 | 55.9 | −1.41 |
| 9 | | 2.421300 (ASP) | 0.400 | | | | |
| 10 | IR-cut filter | plano | 0.300 | Glass | 1.517 | 64.2 | — |
| 11 | | plano | 0.304 | | | | |
| 12 | Image plane | plano | — | | | | |

Note:
Reference wavelength is d-line 587.6 nm

In addition, from the object-side surface 711 to the image-side surface 742, all the surfaces can be aspheric, and the aspheric surfaces can satisfy Condition ASP, but are not limited thereto. As for the parameters of the aspheric surfaces, reference is made to Table 7-2 below:

TABLE 7-2

Aspheric Coefficients

| Surface # | 1 | 2 |
|---|---|---|
| k | −1.08963E+01 | −1.00000E+02 |
| $A_4$ | 4.45023E−01 | −4.26665E−02 |
| $A_6$ | −9.61970E−01 | 1.48804E−01 |
| $A_8$ | 1.89112E+00 | −1.11896E+00 |
| $A_{10}$ | −2.79181E+00 | 3.64404E+00 |
| $A_{12}$ | 2.09844E+00 | −9.55645E+00 |
| $A_{14}$ | −7.36956E−01 | 1.12748E+01 |

| Surface # | 4 | 5 |
|---|---|---|
| k | 0.00000E+00 | 9.78702E+01 |
| $A_4$ | 8.74636E−02 | 2.41610E−01 |
| $A_6$ | 9.57056E−01 | −4.85497E−01 |
| $A_8$ | −9.39319E+00 | 2.30553E+00 |
| $A_{10}$ | 4.13140E+01 | −7.99861E+00 |
| $A_{12}$ | −9.32008E+01 | 1.27674E+01 |
| $A_{14}$ | 8.52417E+01 | −7.85589E+00 |

| Surface # | 6 | 7 |
|---|---|---|
| k | 4.18496E+00 | −3.95147E+00 |
| $A_4$ | −5.84374E−02 | −6.37487E−01 |
| $A_6$ | 1.31802E−01 | 1.08254E+00 |
| $A_8$ | −1.05988E+00 | −1.52990E+00 |
| $A_{10}$ | 5.09696E−01 | 1.22001E+00 |
| $A_{12}$ | −8.41501E+00 | −3.15281E−01 |
| $A_{14}$ | 5.37291E+00 | −2.85181E−02 |

| Surface # | 8 | 9 |
|---|---|---|
| k | −1.24981E+01 | −7.69532E+00 |
| $A_4$ | −1.37801E−01 | −1.69658E−01 |
| $A_6$ | 4.85122E−02 | 8.72580E−02 |
| $A_8$ | 3.56839E−02 | −3.70885E−02 |
| $A_{10}$ | −2.56507E−02 | 9.02050E−03 |
| $A_{12}$ | 5.94397E−03 | −1.05072E−03 |
| $A_{14}$ | −4.89634E−04 | 4.67146E−05 |

The content of Table 7-3 may be deduced from Table 7-1.

TABLE 7-3

Embodiment 7

| f (mm) | 3.18 | $(R_3 + R_4)/(R_3 − R_4)$ | 0.05 |
|---|---|---|---|
| Fno | 2.82 | $(R_7 + R_8)/(R_7 − R_8)$ | −0.35 |
| HFOV (deg.) | 34.9 | $f_3/f_1$ | 0.63 |
| $V_1 − V_2$ | 32.5 | $f_4/f_2$ | 0.18 |
| $T_{12}/CT_2$ | 0.86 | $f/f_3 + |f/f_4|$ | 4.20 |
| $T_{12}/T_{23}$ | 0.57 | SD/TD | 0.83 |

The Eighth Embodiment

Embodiment 8

Figure 8A:
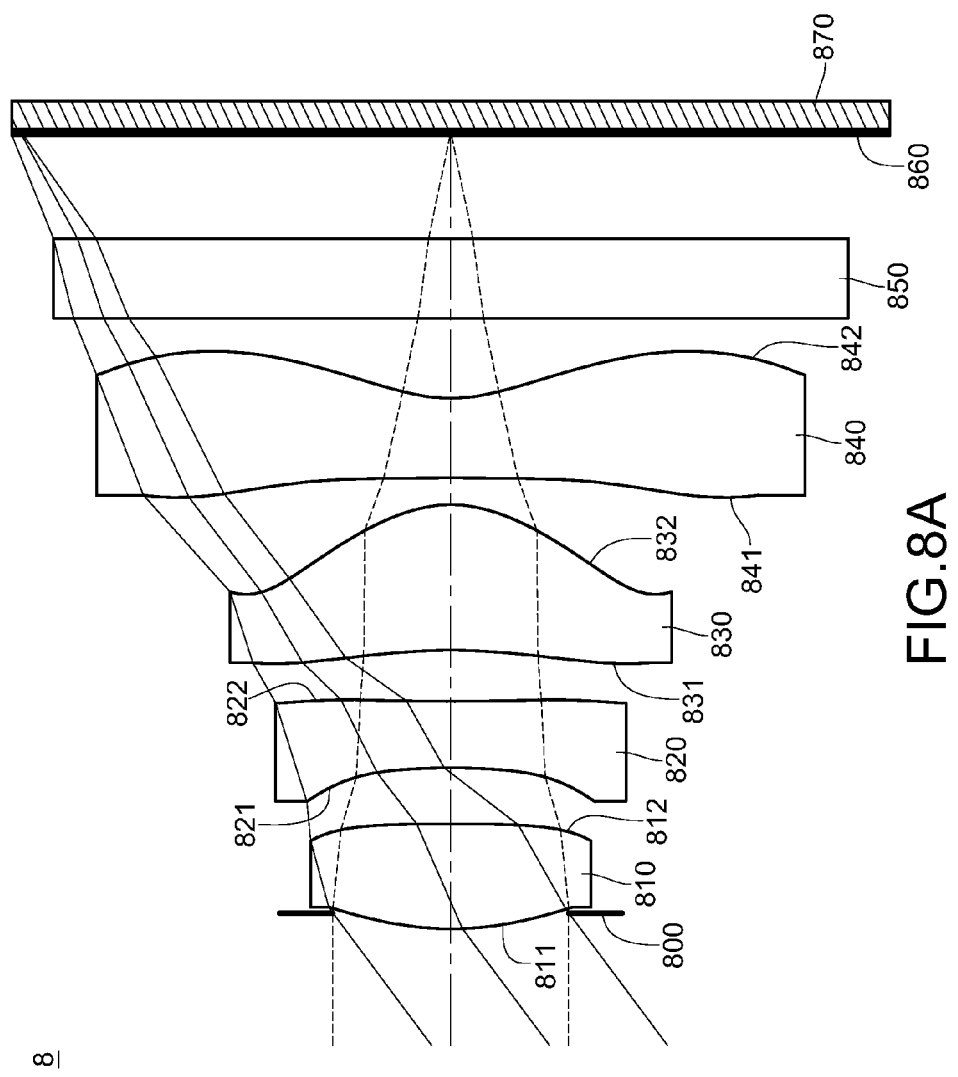
FIG. 8A is a schematic structural view of a seventh embodiment of a imaging lens assembly according to the present disclosure.

FIG. 8A is a schematic structural view of an eighth embodiment of an imaging lens assembly according to the present disclosure. The specific implementation is substantially the same as that in the first embodiment, and the elements in the eighth embodiment are the same as those in the first embodiment, so that the element symbols all begin with "8" as the hundredth digit, which represents that the elements have the same function or structure. For the sake of conciseness, only the differences are illustrated below, and the similar parts will not be repeated herein.

In this embodiment, the first lens element 810 with positive refractive power has a convex aspheric object-side surface 811 and a convex aspheric image-side surface 812. The second lens element 820 with negative refractive power has a concave aspheric object-side surface 821 and a concave aspheric image-side surface 822. The third lens element 830 with positive refractive power has a concave aspheric object-side surface 831 and a convex aspheric image-side surface 832. The fourth lens element 840 with negative refractive power has a concave aspheric object-side surface 841 and a concave aspheric image-side surface 842. The fourth lens element 840 comprises at least one inflection point.

The detailed data of the imaging lens assembly 8 is as shown in Table 8-1 below.

TABLE 8-1

Embodiment 8
f = 2.18 mm, Fno = 2.46, HFOV = 36.6 deg.

| Surface # | | Curvature Radius | Thickness | Material | Index | Abbe # | Focal length |
|---|---|---|---|---|---|---|---|
| 0 | Object | plano | Infinity | | | | |
| 1 | Ape. Stop | plano | −0.060 | | | | |
| 2 | Lens 1 | 1.211200 (ASP) | 0.394 | Plastic | 1.544 | 55.9 | 2.08 |
| 3 | | −15.241100 (ASP) | 0.211 | | | | |
| 4 | Lens 2 | −2.867560 (ASP) | 0.250 | Plastic | 1.640 | 23.3 | −3.33 |
| 5 | | 8.547700 (ASP) | 0.192 | | | | |
| 6 | Lens 3 | −2.293650 (ASP) | 0.548 | Plastic | 1.544 | 55.9 | 0.98 |
| 7 | | −0.468090 (ASP) | 0.100 | | | | |
| 8 | Lens 4 | −99.315800 (ASP) | 0.300 | Plastic | 1.544 | 55.9 | −1.04 |
| 9 | | 0.568550 (ASP) | 0.300 | | | | |
| 10 | IR-cut filter | plano | 0.300 | Glass | 1.517 | 64.2 | — |
| 11 | | plano | 0.388 | | | | |
| 12 | Image plane | plano | — | | | | |

Note:
Reference wavelength is d-line 587.6 nm

In addition, from the object-side surface 811 to the image-side surface 842, all the surfaces can be aspheric, and the aspheric surfaces can satisfy Condition ASP, but are not limited thereto. As for the parameters of the aspheric surfaces, reference is made to Table 8-2 below:

TABLE 8-2

Aspheric Coefficients

| Surface # | 2 | 3 |
|---|---|---|
| k | −4.53302E−01 | −1.25939E+01 |
| $A_4$ | −3.19143E−02 | −3.45097E−01 |
| $A_6$ | −7.21294E−01 | −1.26079E+00 |
| $A_8$ | 4.00153E+00 | 1.36608E+00 |
| $A_{10}$ | −1.56728E+01 | −4.96512E+00 |
| $A_{12}$ | −2.51885E+00 | −3.52856E−01 |
| $A_{14}$ | −3.18611E−02 | −8.49511E+00 |

| Surface # | 4 | 5 |
|---|---|---|
| k | 1.01343E+01 | −1.00000E+00 |
| $A_4$ | −5.20527E−01 | −1.22136E−02 |
| $A_6$ | −2.12019E+00 | −6.76718E−01 |
| $A_8$ | 1.45118E+00 | −1.26351E+00 |
| $A_{10}$ | 8.58752E+00 | 6.25174E+00 |
| $A_{12}$ | −1.36323E+00 | −3.79937E+00 |
| $A_{14}$ | | |

| Surface # | 6 | 7 |
|---|---|---|
| k | 1.50091E+00 | −3.15220E+00 |
| $A_4$ | 1.63334E−01 | −5.91292E−01 |
| $A_6$ | 3.98815E−01 | 1.20848E+00 |
| $A_8$ | 1.75515E+00 | −9.45887E−01 |
| $A_{10}$ | −1.35372E+01 | 9.66313E−01 |
| $A_{12}$ | 2.70638E+01 | 1.51969E+00 |
| $A_{14}$ | −1.52230E+01 | −1.42172E+00 |
| $A_{16}$ | −3.66533E+00 | −9.43446E−01 |

| Surface # | 8 | 9 |
|---|---|---|
| k | −1.00000E+00 | −6.61295E+00 |
| $A_4$ | −1.66797E−01 | −3.15247E−01 |
| $A_6$ | −4.37171E−02 | 3.30492E−01 |
| $A_8$ | 2.88498E−01 | −3.22534E−01 |
| $A_{10}$ | −1.62476E−01 | 2.20748E−01 |
| $A_{12}$ | −2.47874E−03 | −9.35003E−02 |
| $A_{14}$ | 2.38101E−02 | 2.07768E−02 |
| $A_{16}$ | −1.58390E−03 | −4.86871E−03 |

The content of Table 8-3 may be deduced from Table 8-1.

TABLE 8-3

Embodiment 8

| f (mm) | 2.18 | $(R_3 + R_4)/(R_3 − R_4)$ | −0.50 |
|---|---|---|---|
| Fno | 2.46 | $(R_7 + R_8)/(R_7 − R_8)$ | 0.99 |
| HFOV (deg.) | 36.6 | $f_3/f_1$ | 0.47 |
| $V_1 − V_2$ | 32.6 | $f_4/f_2$ | 0.31 |
| $T_{12}/CT_2$ | 0.84 | $f/f_3 + |f/f_4|$ | 4.33 |
| $T_{12}/T_{23}$ | 1.10 | SD/TD | 0.97 |

The Ninth Embodiment

Embodiment 9

Figure 9A:
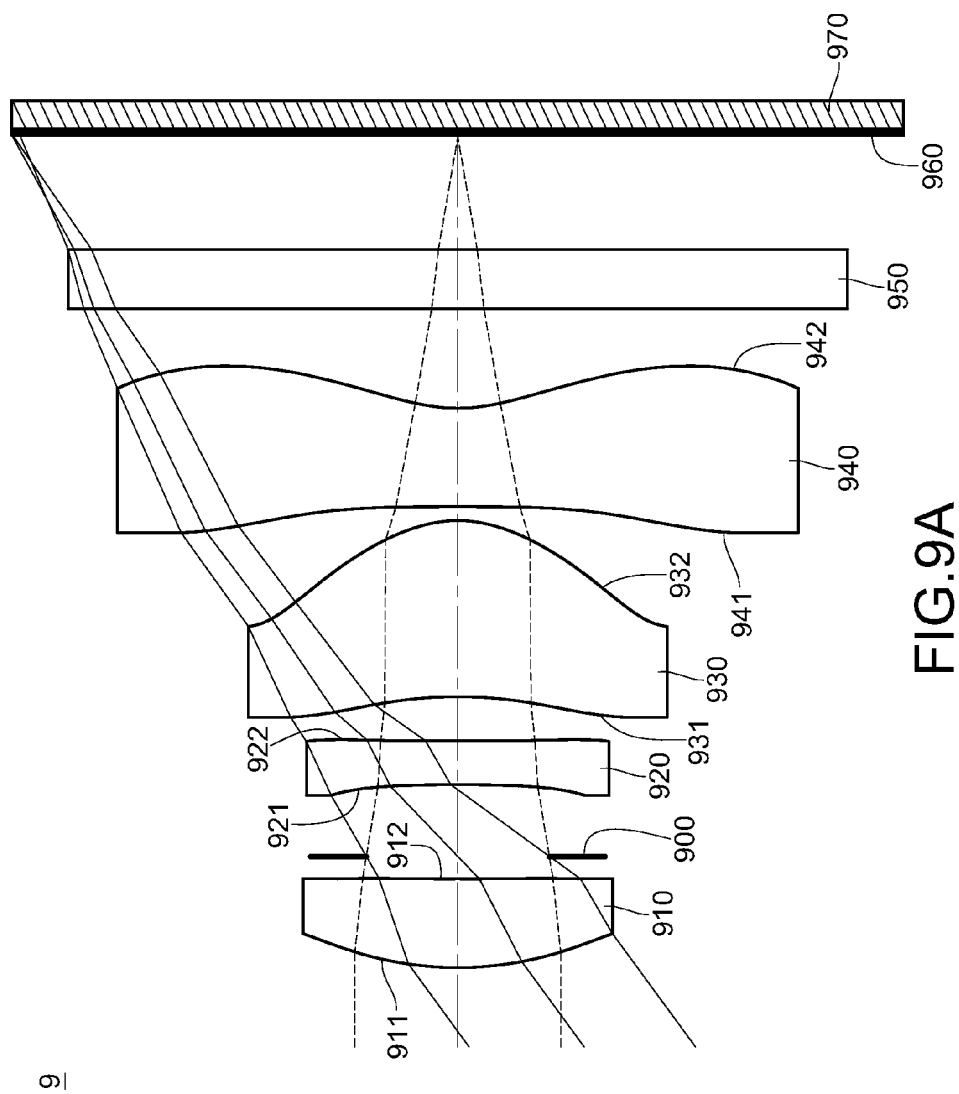
FIG. 9A is a schematic structural view of a seventh embodiment of a imaging lens assembly according to the present disclosure.
Figures 9B, 9C, 9D:
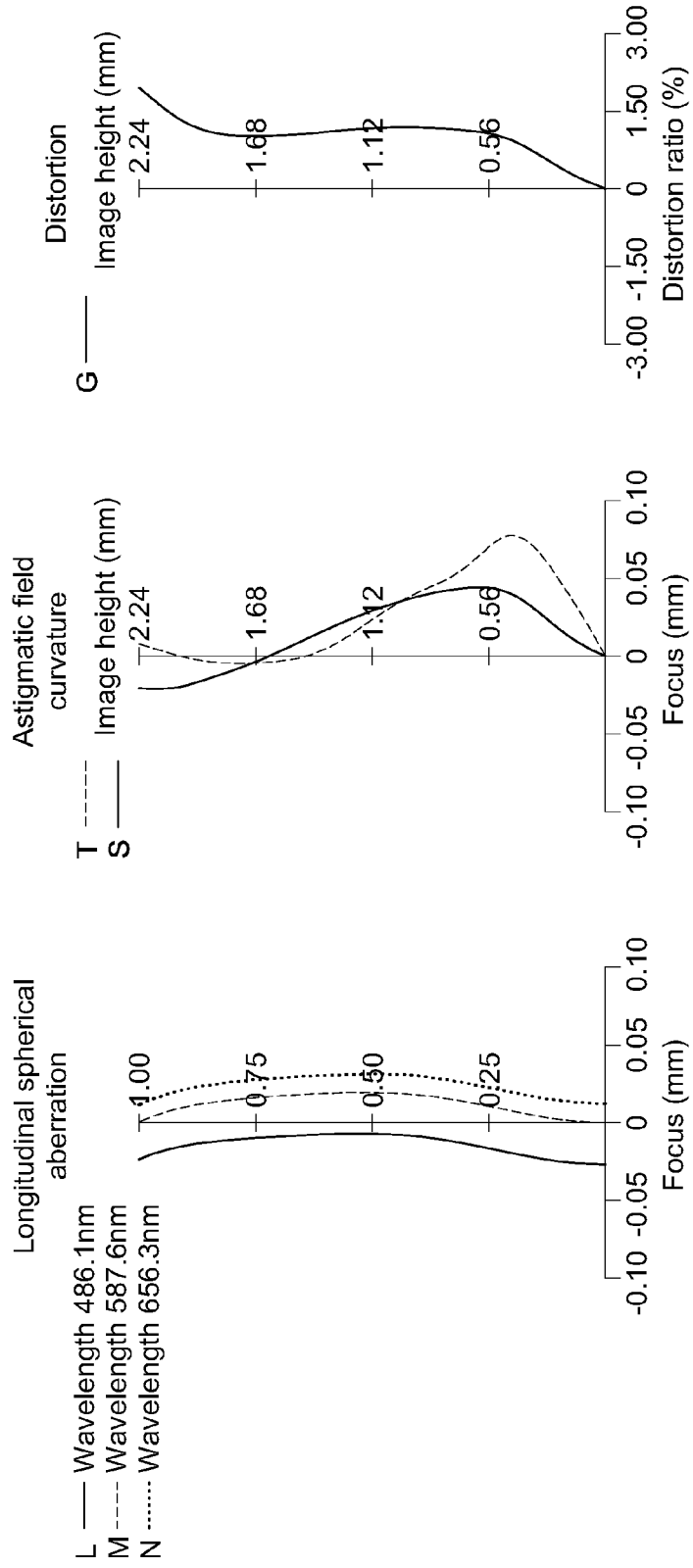
FIG. 9B, FIG. 9C, FIG. 9D are schematic views of longitudinal spherical aberration curves, astigmatic field curves, and a distortion curve, respectively in the imaging lens assembly in FIG. 9A.

FIG. 9A is a schematic structural view of a ninth embodiment of an imaging lens assembly according to the present disclosure. The specific implementation is substantially the same as that in the first embodiment, and the elements in the ninth embodiment are the same as those in the first embodiment, so that the element symbols all begin with "9" as the hundredth digit, which represents that the elements have the same function or structure. For the sake of conciseness, only the differences are illustrated below, and the similar parts will not be repeated herein.

In this embodiment, the first lens element 910 with positive refractive power has a convex aspheric object-side surface 911 and a concave aspheric image-side surface 912. The second lens element 920 with negative refractive power has a concave aspheric object-side surface 921 and a concave aspheric image-side surface 922. The third lens element 930 with positive refractive power has a concave aspheric object-side surface 931 and a convex aspheric image-side surface 932. The fourth lens element 940 with negative refractive power has a concave aspheric object-side surface 941 and a concave aspheric image-side surface 942. The fourth lens element 940 comprises at least one inflection point.

The detailed data of the imaging lens assembly 9 is as shown in Table 9-1 below.

TABLE 9-1

Embodiment 9
f = 3.00 mm, Fno = 2.90, HFOV = 36.2 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 1.714210 (ASP) | 0.447 | Plastic | 1.534 | 55.1 | 3.44 |
| 2 | | 23.590100 (ASP) | 0.113 | | | | |
| 3 | Ape. Stop | plano | 0.361 | | | | |
| 4 | Lens 2 | −7.981600 (ASP) | 0.220 | Plastic | 1.632 | 23.4 | −11.58 |
| 5 | | 89.285700 (ASP) | 0.222 | | | | |
| 6 | Lens 3 | −2.101820 (ASP) | 0.886 | Plastic | 1.530 | 55.8 | 1.37 |
| 7 | | −0.618430 (ASP) | 0.070 | | | | |
| 8 | Lens 4 | −56.350700 (ASP) | 0.495 | Plastic | 1.530 | 55.8 | −1.49 |
| 9 | | 0.802350 (ASP) | 0.500 | | | | |
| 10 | IR-cut filter | plano | 0.300 | Glass | 1.517 | 64.2 | — |
| 11 | | plano | 0.573 | | | | |
| 12 | Image plane | plano | — | | | | |

Note:
Reference wavelength is d-line 587.6 nm

In addition, from the object-side surface 911 to the image-side surface 942, all the surfaces can be aspheric, and the aspheric surfaces can satisfy Condition ASP, but are not limited thereto. As for the parameters of the aspheric surfaces, reference is made to Table 9-2 below:

TABLE 9-2

Aspheric Coefficients

| Surface # | 1 | 2 |
|---|---|---|
| k | −1.67500E+01 | 4.01457E−13 |
| $A_4$ | 4.06679E−01 | −5.41579E−02 |
| $A_6$ | −9.39691E−01 | 2.08955E−01 |
| $A_8$ | 1.95701E+00 | −1.36626E+00 |
| $A_{10}$ | −2.86559E+00 | 3.57261E+00 |
| $A_{12}$ | 2.16301E+00 | −5.51157E+00 |
| $A_{14}$ | −6.95309E−01 | 3.83006E+00 |

| Surface # | 4 | 5 |
|---|---|---|
| k | −1.12585E+01 | −1.83250E+01 |
| $A_4$ | −9.60140E−02 | 1.18699E−01 |
| $A_6$ | 7.88299E−01 | −5.17565E−01 |
| $A_8$ | −9.93631E+00 | 2.29866E+00 |
| $A_{10}$ | 4.28131E+01 | −7.96612E+00 |
| $A_{12}$ | −8.90764E+01 | 1.32579E+01 |
| $A_{14}$ | 7.19229E+01 | −8.51390E+00 |

| Surface # | 6 | 7 |
|---|---|---|
| k | 4.75990E+00 | −3.85125E+00 |
| $A_4$ | 1.07454E−01 | −5.63938E−01 |
| $A_6$ | 3.10808E−01 | 1.05803E+00 |
| $A_8$ | −1.28794E+00 | −1.49946E+00 |
| $A_{10}$ | 5.23062E+00 | 1.25505E+00 |
| $A_{12}$ | −8.04803E+00 | −3.09980E−01 |
| $A_{14}$ | 4.50703E+00 | −4.83333E−02 |

| Surface # | 8 | 9 |
|---|---|---|
| k | −1.77320E+01 | −7.19630E+00 |
| $A_4$ | −1.24265E−01 | −1.41191E−01 |
| $A_6$ | 3.85548E−02 | 8.05677E−02 |
| $A_8$ | 3.49505E−02 | −3.52851E−02 |
| $A_{10}$ | −2.49312E−02 | 9.05579E−03 |
| $A_{12}$ | 6.00269E−03 | −1.12009E−03 |
| $A_{14}$ | −5.64428E−04 | 3.64813E−05 |

The content of Table 9-3 may be deduced from Table 9-1.

TABLE 9-3

| Embodiment 9 | | | |
|---|---|---|---|
| f (mm) | 3.00 | $(R_3 + R_4)/(R_3 − R_4)$ | −0.84 |
| Fno | 2.90 | $(R_7 + R_8)/(R_7 − R_8)$ | 0.97 |
| HFOV (deg.) | 36.2 | $f_3/f_1$ | 0.40 |
| $V_1 − V_2$ | 31.7 | $f_4/f_2$ | 0.13 |
| $T_{12}/CT_2$ | 2.15 | $f/f_3 + |f/f_4|$ | 4.20 |
| $T_{12}/T_{23}$ | 2.14 | SD/TD | 0.80 |

The Tenth Embodiment

Embodiment 10

Figure 10A:
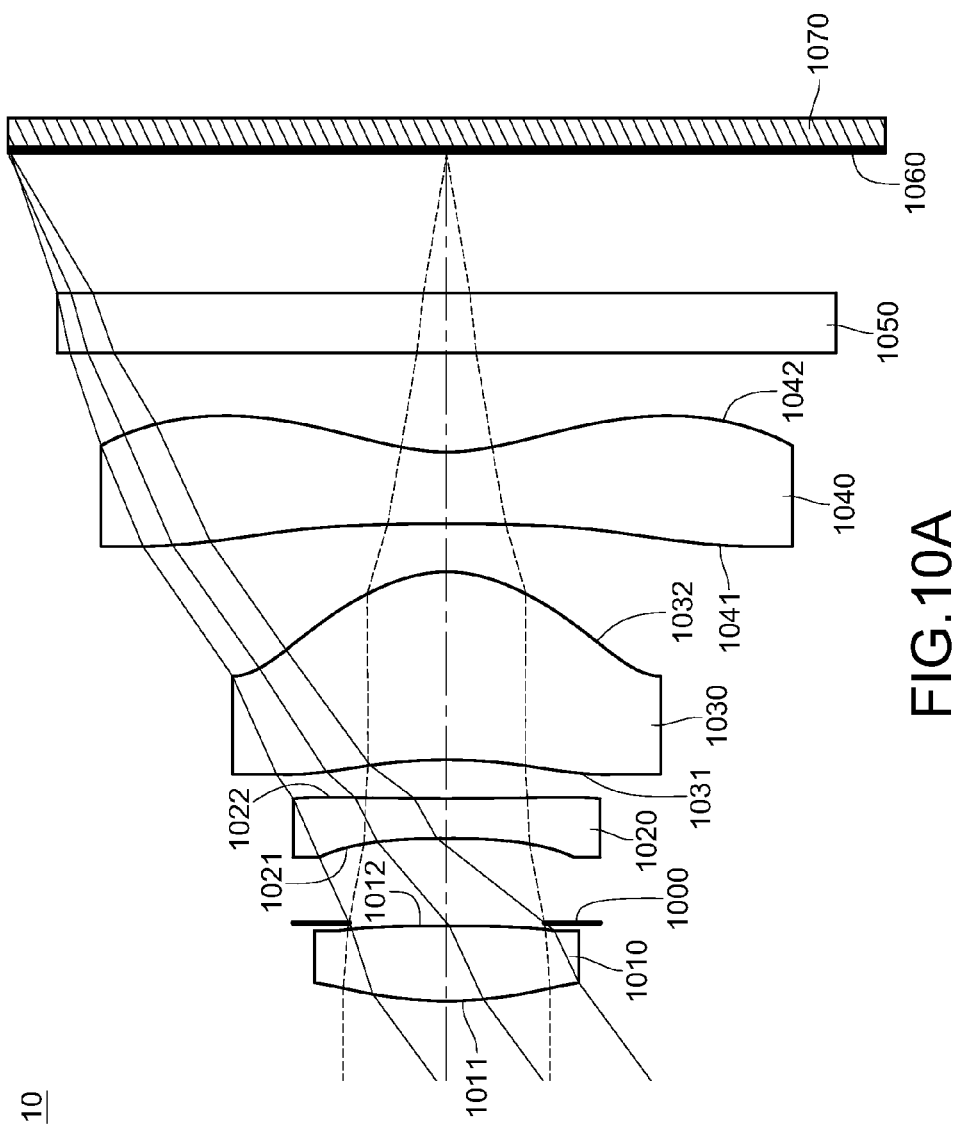
FIG. 10A is a schematic structural view of a seventh embodiment of a imaging lens assembly according to the present disclosure.

FIG. 10A is a schematic structural view of a tenth embodiment of an imaging lens assembly according to the present disclosure. The specific implementation is substantially the same as that in the first embodiment, and the elements in the tenth embodiment are the same as those in the first embodiment, so that the element symbols all begin with "10" as the hundredth digit, which represents that the elements have the same function or structure. For the sake of conciseness, only the differences are illustrated below, and the similar parts will not be repeated herein.

In this embodiment, the first lens element 1010 with positive refractive power has a convex aspheric object-side surface 1011 and a convex aspheric image-side surface 1012. The second lens element 1020 with negative refractive power has a concave aspheric object-side surface 1021 and a concave aspheric image-side surface 1022. The third lens element 1030 with positive refractive power has a concave aspheric object-side surface 1031 and a convex aspheric image-side surface 1032. The fourth lens element 1040 with negative refractive power has a concave aspheric object-side surface 1041 and a concave aspheric image-side surface 1042. The fourth lens element 1040 comprises at least one inflection point.

The detailed data of the imaging lens assembly 10 is as shown in Table 10-1 below.

TABLE 10-1

Embodiment 10
f = 3.01 mm, Fno = 2.90, HFOV = 36.3 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 1.924920 (ASP) | 0.378 | Plastic | 1.543 | 56.5 | 3.13 |
| 2 | | −13.422800 (ASP) | 0.015 | | | | |
| 3 | Ape. Stop | plano | 0.425 | | | | |
| 4 | Lens 2 | −3.987900 (ASP) | 0.200 | Plastic | 1.614 | 25.6 | −5.48 |
| 5 | | 21.929800 (ASP) | 0.194 | | | | |
| 6 | Lens 3 | −2.630100 (ASP) | 0.944 | Plastic | 1.514 | 56.8 | 1.46 |
| 7 | | −0.656260 (ASP) | 0.242 | | | | |
| 8 | Lens 4 | −17.160100 (ASP) | 0.360 | Plastic | 1.534 | 55.1 | −1.70 |
| 9 | | 0.964960 (ASP) | 0.500 | | | | |
| 10 | IR-cut filter | plano | 0.300 | Glass | 1.517 | 64.2 | — |
| 11 | | plano | 0.701 | | | | |
| 12 | Image plane | plano | — | | | | |

Note:
Reference wavelength is d-line 587.6 nm

In addition, from the object-side surface 1011 to the image-side surface 1042, all the surfaces can be aspheric, and the aspheric surfaces can satisfy Condition ASP, but are not limited thereto. As for the parameters of the aspheric surfaces, reference is made to Table 10-2 below:

TABLE 10-2

Aspheric Coefficients

| Surface # | 1 | 2 |
|---|---|---|
| k | −2.85857E+01 | −2.23360E+01 |
| $A_4$ | 4.00739E−01 | −9.68927E−02 |
| $A_6$ | −1.14666E+00 | −1.00285E−01 |
| $A_8$ | 1.84688E+00 | −1.05269E+00 |
| $A_{10}$ | −2.36072E+00 | 4.00560E+00 |
| $A_{12}$ | 1.05683E+00 | −7.41587E+00 |
| $A_{14}$ | −2.66877E−01 | 5.52520E+00 |

| Surface # | 4 | 5 |
|---|---|---|
| k | 1.12000E−01 | −1.83250E+01 |
| $A_4$ | −2.70751E−01 | 3.01513E−02 |
| $A_6$ | 1.29048E+00 | −4.99456E−01 |
| $A_8$ | −1.07946E+01 | 2.83453E+00 |
| $A_{10}$ | 4.20106E+01 | −8.45860E+00 |
| $A_{12}$ | −8.60602E+01 | 1.18115E+01 |
| $A_{14}$ | 7.18554E+01 | −6.38511E+00 |

| Surface # | 6 | 7 |
|---|---|---|
| k | 7.77428E+00 | −3.86058E+00 |
| $A_4$ | 5.70846E−03 | −5.67018E−01 |
| $A_6$ | 6.17317E−01 | 1.10085E+00 |
| $A_8$ | −1.75823E+00 | −1.54382E+00 |
| $A_{10}$ | 5.23291E+00 | 1.25384E+00 |
| $A_{12}$ | −7.33073E+00 | −3.02586E−01 |
| $A_{14}$ | 3.84643E+00 | −4.75550E−02 |

| Surface # | 8 | 9 |
|---|---|---|
| k | −1.77320E+01 | −7.81679E+00 |
| $A_4$ | −5.05183E−02 | −1.39302E−01 |
| $A_6$ | −1.00421E−02 | 7.91165E−02 |
| $A_8$ | 4.32197E−02 | −3.70996E−02 |
| $A_{10}$ | −2.29544E−02 | 1.06012E−02 |
| $A_{12}$ | 5.25084E−03 | −1.51944E−03 |
| $A_{14}$ | −4.95588E−04 | 6.88085E−05 |

The content of Table 10-3 may be deduced from Table 10-1.

TABLE 10-3

Embodiment 10

| f (mm) | 3.01 | $(R_3 + R_4)/(R_3 − R_4)$ | −0.69 |
|---|---|---|---|
| Fno | 2.90 | $(R_7 + R_8)/(R_7 − R_8)$ | 0.89 |
| HFOV (deg.) | 36.3 | $f_3/f_1$ | 0.47 |
| $V_1 − V_2$ | 30.9 | $f_4/f_2$ | 0.31 |
| $T_{12}/CT_2$ | 2.20 | $f/f_3 + |f/f_4|$ | 3.82 |
| $T_{12}/T_{23}$ | 2.27 | SD/TD | 0.86 |

What is claimed is:

1. An imaging lens assembly comprising, in order from an object side to an image side:
   a first lens element with positive refractive power comprising a convex object-side surface;
   a second lens element with negative refractive power comprising a concave object-side surface and a concave image-side surface;
   a third lens element with positive refractive power comprising a concave aspheric object-side surface and a convex aspheric image-side surface; and
   a fourth lens element with negative refractive power comprising a concave aspheric object-side surface and a concave aspheric image-side surface, at least one of the object-side surface and the image-side surface comprising at least one inflection point;
   wherein following conditions are satisfied:

$1.0<T_{12}/CT_2<3.0$;

$25<V_1-V_2<60$;

$0<f_3/f_1<0.75$;

wherein $T_{12}$ is an axial distance between the first lens element and the second lens element, $CT_2$ is a central thickness of the second lens element, $V_1$ is the Abbe number of the first lens element, $V_2$ is the Abbe number of the second lens element, $f_1$ is the focal length of the first lens element, and $f_3$ is the focal length of the third lens element.

2. The imaging lens assembly according to claim 1, wherein the imaging lens assembly further satisfies the following condition:

$-1<(R_3+R_4)/(R_3-R_4)<0$;

wherein $R_3$ is the curvature radius of the object-side surface of the second lens element, and $R_4$ is the curvature radius of the image-side surface of the second lens element.

3. The imaging lens assembly according to claim 2, wherein the imaging lens assembly further satisfies the following condition:

$0<(R_7+R_8)/(R_7-R_8)<1$;

wherein $R_7$ is the curvature radius of the object-side surface of the fourth lens element, and $R_8$ is the curvature radius of the image-side surface of the fourth lens element.

4. The imaging lens assembly according to claim 3, wherein the imaging lens assembly further comprises a stop, the stop is disposed between the first lens element and the second lens element.

5. The imaging lens assembly according to claim 4, wherein the imaging lens assembly further satisfies the following condition:

$0.70<SD/TD<0.92$;

wherein TD is an axial distance between the object-side surface of the first lens element and the image-side surface of the fourth lens element, and SD is an axial distance between the stop and the image-side surface of the fourth lens element.

6. The imaging lens assembly according to claim 4, wherein the imaging lens assembly further satisfies the following condition:

$3.5<f/f_3+|f/f_4|<6.5$;

wherein f is the focal length of the imaging lens assembly, $f_3$ is the focal length of the third lens element, and $f_4$ is the focal length of the fourth lens element.

7. The imaging lens assembly according to claim 4, wherein the imaging lens assembly further satisfies the following condition:

$0.8<(R_7+R_8)/(R_7-R_8)<1$;

wherein $R_7$ is the curvature radius of the object-side surface of the fourth lens element, and $R_8$ is the curvature radius of the image-side surface of the fourth lens element.

8. The imaging lens assembly according to claim 3, wherein the imaging lens assembly further satisfies the following condition:

$$-1<(R_3+R_4)/(R_3-R_4)<-0.3;$$

wherein $R_3$ is the curvature radius of the object-side surface of the second lens element, and $R_4$ is the curvature radius of the image-side surface of the second lens element.

9. The imaging lens assembly according to claim 8, wherein the imaging lens assembly further satisfies the following condition:

$$1.2<T_{12}/CT_2<3.0;$$

wherein $T_{12}$ is an axial distance between the first lens element and the second lens element, and $CT_2$ is a central thickness of the second lens element.

10. The imaging lens assembly according to claim 8, wherein the imaging lens assembly further satisfies the following condition:

$$0<f_4/f_2<0.35;$$

wherein $f_2$ is the focal length of the second lens element, and $f_4$ is the focal length of the fourth lens element.

11. The imaging lens assembly according to claim 8, wherein the imaging lens assembly further satisfies the following condition:

$$1<T_{12}/T_{23}<2.4;$$

wherein $T_{12}$ is an axial distance between the first lens element and the second lens element, and $T_{23}$ is an axial distance between the second lens element and the third lens element.

12. An imaging lens assembly comprising, in order from an object side to an image side:
a first lens element with positive refractive power comprising a convex object-side surface;
a second lens element with negative refractive power comprising a concave object-side surface and a concave image-side surface;
a third lens element with positive refractive power comprising a concave aspheric object-side surface and a convex aspheric image-side surface; and
a fourth lens element with negative refractive power comprising a concave aspheric object-side surface and a concave aspheric image-side surface, at least one of the object-side surface and the image-side surface comprising at least one inflection point;
wherein the imaging lens assembly further comprises a stop, the stop is disposed between the first lens element and the second lens element, and following conditions are satisfied:

$$1.0<T_{12}/CT_2<3.0;$$

$$25<V_1-V_2<60;$$

$$0.70<SD/TD<0.92;$$

wherein $T_{12}$ is an axial distance between the first lens element and the second lens element, $CT_2$ is a central thickness of the second lens element, $V_1$ is the Abbe number of the first lens element, $V_2$ is the Abbe number of the second lens element, TD is an axial distance between the object-side surface of the first lens element and the image-side surface of the fourth lens element, and SD is an axial distance between the stop and the image-side surface of the fourth lens element.

13. The imaging lens assembly according to claim 12, wherein the imaging lens assembly further satisfies the following condition:

$$0<(R_7+R_8)/(R_7-R_8)<1;$$

wherein $R_7$ is the curvature radius of the object-side surface of the fourth lens element, and $R_8$ is the curvature radius of the image-side surface of the fourth lens element.

14. The imaging lens assembly according to claim 13, wherein the imaging lens assembly further satisfies the following condition:

$$1<T_{12}/T_{23}<2.4;$$

wherein $T_{12}$ is an axial distance between the first lens element and the second lens element, and $T_{23}$ is an axial distance between the second lens element and the third lens element.

15. The imaging lens assembly according to claim 14, the imaging lens assembly further satisfies the following condition:

$$3.5<f/f_3+|f/f_4|<6.5;$$

wherein f is the focal length of the imaging lens assembly, $f_3$ is the focal length of the third lens element, and $f_4$ is the focal length of the fourth lens element.

16. The imaging lens assembly according to claim 14, wherein the imaging lens assembly further satisfies the following condition:

$$0.8<(R_7+R_8)/(R_7-R_8)<1;$$

wherein $R_7$ is the curvature radius of the object-side surface of the fourth lens element, and $R_8$ is the curvature radius of the image-side surface of the fourth lens element.

17. The imaging lens assembly according to claim 14, wherein the imaging lens assembly satisfies the following condition:

$$-1<(R_3+R_4)/(R_3-R_4)<-0.3;$$

$R_3$ is the curvature radius of the object-side surface of the second lens element, and $R_4$ is the curvature radius of the image-side surface of the second lens element.

18. The imaging lens assembly according to claim 14, wherein the imaging lens assembly further satisfies the following condition:

$$0<f_4/f_2<0.35;$$

wherein $f_2$ is the focal length of the second lens element, and $f_4$ is the focal length of the fourth lens element.

19. The imaging lens assembly according to claim 14, wherein the imaging lens assembly further satisfies the following condition:

$$1.2<T_{12}/CT_2<3.0;$$

wherein $T_{12}$ is an axial distance between the first lens element and the second lens element, and $CT_2$ is a central thickness of the second lens element.

20. The imaging lens assembly according to claim 14, wherein the imaging lens assembly further satisfies the following condition:

$$0<f_3/f_1<0.75;$$

wherein $f_1$ is the focal length of the first lens element, and $f_3$ is the focal length of the third lens element.

* * * * *